(12) United States Patent
Yuan et al.

(10) Patent No.: US 12,253,383 B2
(45) Date of Patent: Mar. 18, 2025

(54) SYSTEMS AND METHODS FOR ROUTE PLANNING ON TOPOGRAPHICAL MAP USING VEHICLE MOTION

(71) Applicant: ZHEJIANG HUARAY TECHNOLOGY CO., LTD., Zhejiang (CN)

(72) Inventors: Yuanqiang Yuan, Hangzhou (CN); Wei Lu, Hangzhou (CN); Yidong Jin, Hangzhou (CN); Jun Yin, Hangzhou (CN); Fangbo Mu, Hangzhou (CN)

(73) Assignee: ZHEJIANG HUARAY TECHNOLOGY CO., LTD., Hangzhou (CN)

( * ) Notice: Subject to any disclaimer, the term of this patent is extended or adjusted under 35 U.S.C. 154(b) by 230 days.

(21) Appl. No.: 17/305,722

(22) Filed: Jul. 14, 2021

(65) Prior Publication Data
US 2021/0341309 A1    Nov. 4, 2021

Related U.S. Application Data

(63) Continuation of application No. PCT/CN2020/070820, filed on Jan. 8, 2020.

(30) Foreign Application Priority Data

Jan. 14, 2019    (CN) .......................... 201910032301.5

(51) Int. Cl.
*G01C 21/00* (2006.01)
*G01C 21/34* (2006.01)
*G01C 21/36* (2006.01)

(52) U.S. Cl.
CPC ..... *G01C 21/3889* (2020.08); *G01C 21/3461* (2013.01); *G01C 21/3614* (2013.01); *G01C 21/3874* (2020.08)

(58) Field of Classification Search
CPC ............ G01C 21/3889; G01C 21/3874; G01C 21/3461; G01C 21/3614; G01C 21/34; G01C 21/00; G05D 1/02; G08G 1/16
See application file for complete search history.

(56) References Cited

U.S. PATENT DOCUMENTS 5,283,739 A    2/1994  Summerville et al.
9,953,523 B2 *  4/2018  Linder .................. G08G 1/0145
(Continued)

FOREIGN PATENT DOCUMENTS

CN    106251016 A    12/2016
CN    106556406 A    4/2017
(Continued)

OTHER PUBLICATIONS

International Search Report in PCT/CN2020/070820 mailed on Mar. 27, 2020, 5 pages.
(Continued)

*Primary Examiner* — Jess Whittington
*Assistant Examiner* — Terry C Buse
(74) *Attorney, Agent, or Firm* — METIS IP LLC

(57) ABSTRACT

The present disclosure may provide a method for route planning. The method may include obtaining a start location and a destination of a target vehicle. The method may also include obtaining a map of a target region including the start location and the destination. The map may include node information of each of a plurality of nodes. Further, the method may include obtaining motion status information associated with one or more vehicles other than the target vehicle in the target region. The method may further include determining a target route of the target vehicle based at least in part on the start location, the destination, the motion status information associated with the one or more vehicles, and the map.

14 Claims, 10 Drawing Sheets

(56) References Cited

U.S. PATENT DOCUMENTS

| | | | |
|---|---|---|---|
| 2008/0114542 A1* | 5/2008 | Nambata | G01C 21/3453 |
| | | | 701/533 |
| 2015/0227140 A1* | 8/2015 | Douglas | G05D 1/0217 |
| | | | 701/23 |
| 2017/0199041 A1 | 7/2017 | Itabashi et al. | |
| 2017/0269602 A1* | 9/2017 | Nakamura | G01C 21/3492 |
| 2019/0120640 A1* | 4/2019 | Ho | G01C 21/3453 |
| 2020/0042014 A1 | 2/2020 | Martens et al. | |

FOREIGN PATENT DOCUMENTS

| | | | | |
|---|---|---|---|---|
| CN | 106774347 A | | 5/2017 | |
| CN | 106931975 A | | 7/2017 | |
| CN | 107167154 A | | 9/2017 | |
| CN | 107179773 A | | 9/2017 | |
| CN | 107727099 A | | 2/2018 | |
| CN | 108469827 | * | 5/2018 | G05D 1/0236 |
| CN | 108170146 A | | 6/2018 | |
| CN | 108287545 A | | 7/2018 | |
| CN | 108762268 A | | 11/2018 | |
| CN | 108919300 A | | 11/2018 | |
| CN | 109032135 A | | 12/2018 | |
| CN | 109131318 A | | 1/2019 | |
| EP | 0618523 A1 | | 10/1994 | |
| JP | 2016170580 A | | 9/2016 | |
| WO | 2018180175 A1 | | 10/2018 | |
| WO | 2020147621 A1 | | 7/2020 | |

OTHER PUBLICATIONS

Written Opinion in PCT/CN2020/070820 mailed on Mar. 27, 2020, 5 pages.
First Office Action in Chinese Application No. 201910032301.5 mailed on Apr. 16, 2020, 15 pages.
The Second Office Action in Chinese Application No. 201910032301.5 mailed on Oct. 23, 2020, 9 pages.
The Third Office Action in Chinese Application No. 201910032301.5 mailed on Feb. 20, 2021, 17 pages.
Guo, Lixiao, Intelligent Path Planning for Automated Guided Vehicles Based on Topological Map, China Excellent Master's Thesis Full-text Database Information Technology Series, 2014, 67 Pages.
The Extended European Search Report in European Application No. 20741311.3 mailed on Feb. 1, 2022, 7 pages.
Notice of Reasons for Rejection in Japanese Application No. 2021-541089 mailed on Oct. 31, 2022, 13 pages.

* cited by examiner

SYSTEMS AND METHODS FOR ROUTE PLANNING ON TOPOGRAPHICAL MAP USING VEHICLE MOTION

CROSS-REFERENCE TO RELATED APPLICATIONS

This application is a Continuation of International Application No. PCT/CN2020/070820, filed on Jan. 8, 2020, which claims priority to Chinese Application No. 201910032301.5, filed on Jan. 14, 2019, the entire contents of each of which are hereby incorporated by reference.

TECHNICAL FIELD

The present disclosure generally relates to route planning, and in particular, to systems and methods for route planning based on a map (e.g., a topological map).

BACKGROUND

With the development of automation technology and computer technology, the exploration of route planning for transportation vehicles (e.g., automated guided vehicles) has developed rapidly nowadays. Commonly, for a vehicle, a route planning system can determine a route from a start location to a destination based on a map (e.g., a topological map, a grid map) which may include a plurality of nodes and node information (e.g., a passability of a node) thereof. However, in some cases, motion information of other vehicles may affect the node information (e.g., the passability) of the nodes, which may accordingly affect the accuracy and efficiency of the route planning. Therefore, it is desirable to provide systems and methods for accurate and efficient route planning with motion information taken into consideration.

SUMMARY

In a first aspect of the present disclosure, a method for route planning for an automatic guided vehicle (AGV) based on a topological map may be provided. The method may include obtaining a topological map corresponding to a scheduling system; preprocessing the topological map and obtaining a modified topological map by modifying node information of the topological map based on motion status information associated with a plurality of AGVs in the scheduling system and a plurality of nodes occupied by the plurality of AGVs in the topological map; determining a start node and a destination node of a current AGV in the modified topological map; determining, based on node information of the modified topological map, a plurality of total costs associated with a plurality of nodes between the start node and the destination node; and performing a route planning for the current AGV based on the plurality of total costs.

In a second aspect of the present disclosure, a device for route planning for an automatic guided vehicle (AGV) based on a topological map may be provided. The device may include at least one processor and at least one storage storing program codes. When the program codes are executed by the at least one processor, the program codes may direct the at least one processor to perform a method. The method may include obtaining a topological map corresponding to a scheduling system; preprocessing the topological map and obtaining a modified topological map by modifying node information of the topological map based on motion status information associated with a plurality of AGVs in the scheduling system and a plurality of nodes occupied by the plurality of AGVs in the topological map; determining a start node and a destination node of a current AGV in the modified topological map; determining, based on node information of the modified topological map, a plurality of total costs associated with a plurality of nodes between the start node and the destination node; and performing a route planning for the current AGV based on the plurality of total costs.

In a third aspect of the present disclosure, a computer readable storage medium may be provided. The computer readable storage medium may include computer programs that, when executed by at least one processor, a method may be performed. The method may include obtaining a topological map corresponding to a scheduling system; preprocessing the topological map and obtaining a modified topological map by modifying node information of the topological map based on motion status information associated with a plurality of AGVs in the scheduling system and a plurality of nodes occupied by the plurality of AGVs in the topological map; determining a start node and a destination node of a current AGV in the modified topological map; determining, based on node information of the modified topological map, a plurality of total costs associated with a plurality of nodes between the start node and the destination node; and performing a route planning for the current AGV based on the plurality of total costs.

In a fourth aspect of the present disclosure, a system for route planning may be provided. The system for route planning may include at least one storage device including a set of instructions and at least one processor in communication with the at least one storage device. When executing the set of instructions, the at least one processor may be configured to cause the system to: obtain a start location and a destination of a target vehicle; obtain a map of a target region including the start location and the destination, the map including node information of each of a plurality of nodes; obtain motion status information associated with one or more vehicles other than the target vehicle in the target region; and determine a target route of the target vehicle based at least in part on the start location, the destination, the motion status information associated with the one or more vehicles, and the map.

In a fifth aspect of the present disclosure, a method may be provided. The method may be implemented on a computing device including at least one processor, at least one storage medium, and a communication platform connected to a network. The method may include obtaining a start location and a destination of a target vehicle; obtaining a map of a target region including the start location and the destination, the map including node information of each of a plurality of nodes; obtaining motion status information associated with one or more vehicles other than the target vehicle in the target region; and determining a target route of the target vehicle based at least in part on the start location, the destination, the motion status information associated with one or more vehicles, and the map.

In a sixth aspect of the present disclosure, a system for route planning may be provided. The system may include a location obtaining module configured to obtain a start location and a destination of a target vehicle; a map obtaining module configured to obtain a map of a target region including the start location and the destination, the map including node information of each of a plurality of nodes; a motion status obtaining module configured to obtain motion status information associated with one or more vehicles other than the target vehicle in the target region; and a route determination module configured to determine a target route of the target vehicle based at least in part on the start location, the destination, the motion status information associated with one or more vehicles, and the map.

In a seventh aspect of the present disclosure, a non-transitory computer readable medium may be provided. The non-transitory computer readable medium may include executable instructions that, when executed by at least one processor, may direct the at least one processor to perform a method. The method may include obtaining a start location and a destination of a target vehicle; obtaining a map of a target region including the start location and the destination, the map including node information of each of a plurality of nodes; obtaining motion status information associated with one or more vehicles other than the target vehicle in the target region; and determining a target route of the target vehicle based at least in part on the start location, the destination, the motion status information associated with one or more vehicles, and the map.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which Ike reference numerals represent similar structures throughout the several views of the drawings, and wherein.

DETAILED DESCRIPTION

Figure 1:
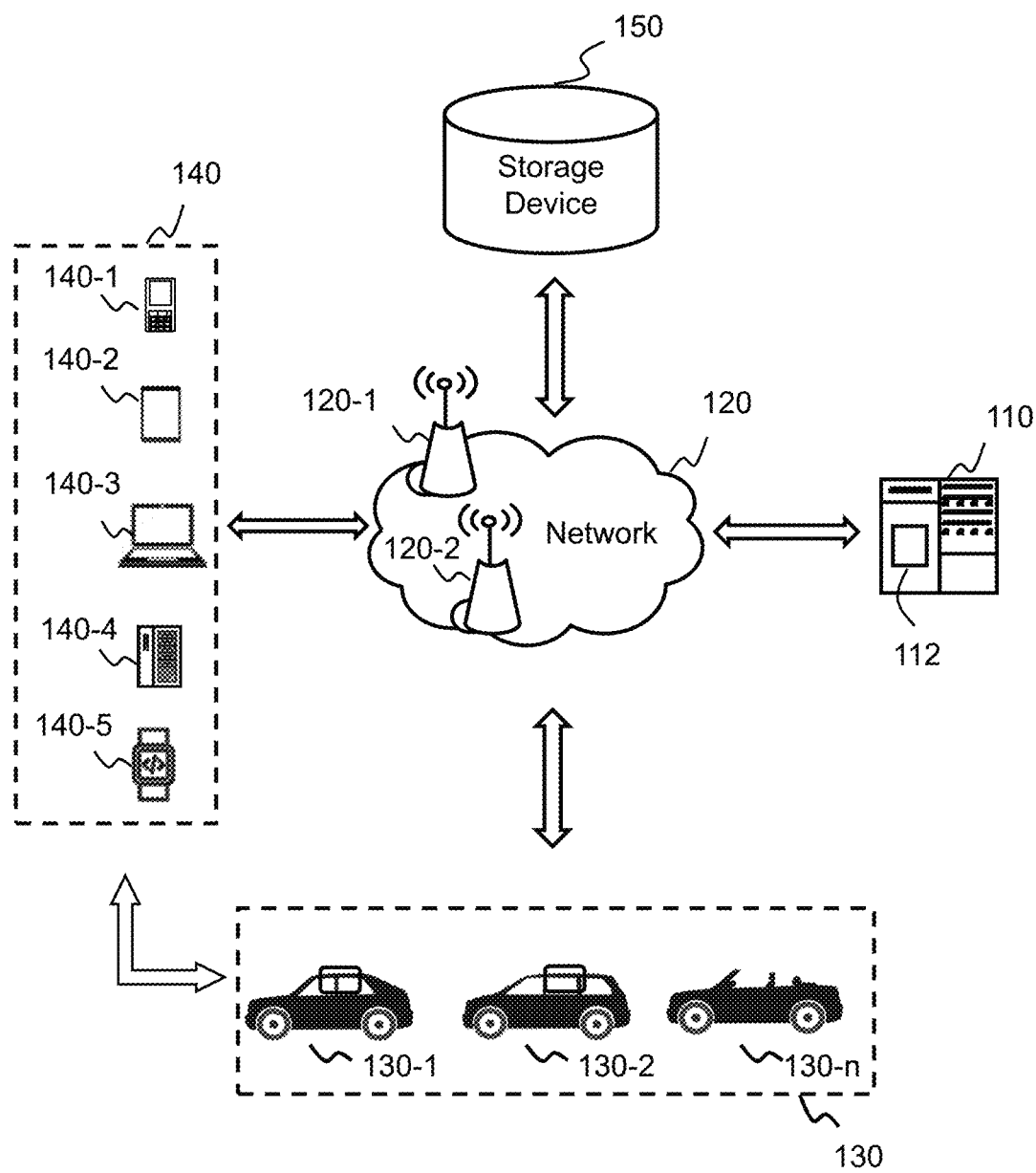
FIG. 1 is a schematic diagram illustrating an exemplary route planning system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "unit," "module," and/or "block" used herein are one method to distinguish different components, elements, parts, sections or assemblies of different levels in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage devices. In some embodiments, a software module may be compiled and linked into an executable program. It will be appreciated that software modules can be capable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for route planning based on a map (e.g., a topological map). The map may include a plurality of nodes and node information thereof, for example, a location of a node, a barcode of a node, a coordinate of a node, a passibility of a node, a turn capability of a node, a count of adjacent nodes, a connectivity of a node to adjacent nodes, etc. The systems may determine a start location and a destination of a target vehicle. The systems may also obtain motion status information associated with one or more vehicles other than the target vehicle located in a target region where the target vehicle is located. The systems may generate a target map by modifying at least part of node information of each of at least one of the plurality of nodes based on the motion status information associated with the one or more vehicles. Then the systems may determine a target route of the target vehicle based on the target map, the start location, and the destination. When determining the target route, the systems may determine a plurality of costs associated with a plurality of target nodes between a start node corresponding to the start location a destination node corresponding to the destination.

According to the systems and methods of the present disclosure, the motion status information associated with other vehicles may be taken into consideration, which can ensure that the target vehicle does not collide with other vehicles when moving along the target route. Further, when determining the target route, the cost of a node may be associated with various parameters, such as a weight value of the node, a cost of a parent node of the node, a distance cost from a parent node to the node, a turn cost from the parent node to the node, etc., which can improve an accuracy and a reasonability of the target route.

FIG. 1 is a schematic diagram illustrating an exemplary route planning system according to some embodiments of the present disclosure. In some embodiments, the route planning system (also referred to as a "scheduling system") 100 may include a server 110, a network 120, one or more vehicles 130, one or more terminal devices 140, and a storage device 150. In some embodiments, the route planning system 100 may be applied in various scenarios, for example, freight transport based on automated guided vehicles (AGVs), sightseeing in a predetermined region (e.g., a park), automatic food delivery, etc.

The server 110 may be a single server or a server group. The server group may be centralized or distributed (e.g., the server 110 may be a distributed system). In some embodiments, the server 110 may be local or remote. For example, the server 110 may access information and/or data stored in the vehicle(s) 130, the terminal device(s) 140, and/or the storage device 150 via the network 120. As another example, the server 110 may be directly connected to the vehicle(s) 130, the terminal device(s) 140, and/or the storage device 150 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data associated with route planning and/or task allocation to perform one or more functions described in the present disclosure. For example, the processing device 112 may obtain motion status information associated with one or more vehicles other than a target vehicle in a target region. The processing device 112 may also determine a target route of the target vehicle based at least in part on a start location of the target vehicle, a destination of the target vehicle, the motion status information associated with the one or more vehicles, and a map of the target region. In some embodiments, the processing device 112 may include one or more processing engines (e.g., single-core processing engine(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPI), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the server 110 may be connected to the network 120 to communicate with one or more components (e.g., the vehicle(s) 130, the terminal device(s) 140, the storage device 150) of the route planning system 100. In some embodiments, the server 110 may be directly connected to or communicate with one or more components (e.g., the vehicle(s) 130, the terminal device(s) 140, the storage device 150) of the route planning system 100.

The network 120 may facilitate exchange of information and/or data. In some embodiments, one or more components (e.g., the server 110, the vehicle(s) 130, the terminal device(s) 140, the storage device 150) of the route planning system 100 may transmit information and/or data to other component(s) of the route planning system 100 via the network 120. For example, the server 110 may obtain a map of a target region from the storage device 150 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points (e.g., a point 120-1, a point 120-2), through which one or more components of the route planning system 100 may be connected to the network 120 to exchange data and/or information.

The vehicle(s) 130 may include a plurality of vehicles 130-1, 130-2, . . . , 130-n. The vehicle(s) 130 may include an automatic guided vehicle (AGV), a taxi, a private car, a hitch, a bus, a train, a bullet train, a high-speed rail, a subway, a vessel, an aircraft, a spaceship, a hot-air balloon, a driverless vehicle (e.g., a driverless airplane, a driverless car), or the like, or any combination thereof. The vehicle(s) 130 may communicate with the server 110, the terminal device(s) 140, and/or the storage device 150 via the network 120. In some embodiments, the vehicle(s) 130 may receive a task (e.g., delivering goods) allocated by the server 110 and perform the task along a route determined by the server 110. In some embodiments, the vehicle(s) 130 may transmit motion status information of the vehicle(s) 130 to the server 110 via the network 120 and the server 110 may process the motion status information when determining the route for the vehicle(s).

The terminal device 140 may be configured to receive information and/or data from the server 110, the vehicle(s) 130, and/or the storage device 150 via the network 120. For example, the terminal device 140 may receive information (e.g., a route, a start location, a destination) associated with a task (e.g., delivering goods) from the server 110 and/or a vehicle which is to execute or is executing the task via the network 120. In some embodiments, the terminal device 140 may provide a user interface via which a user may view information and/or input data and/or instructions to the route planning system 100. For example, a user may view the information (e.g., the route, the start location, the destination) associated with the task via the user interface. As another example, the terminal device 140 may input an instruction via the user interface and transmit the instruction to the vehicle(s) 130 and/or the server 110 via the network 120. The instruction may include an instruction for executing a task, an instruction for stopping executing a task, an instruction for setting or modifying a parameter associated with a task, an instruction for charging one of the vehicle(s) 130, an instruction for maintaining one of the vehicle(s) 130, an instruction for allocating a task to one of the vehicle(s) 130, etc.

In some embodiments, the terminal device(s) 140 may include a mobile device 140-1, a tablet computer 140-2, a laptop computer 140-3, a built-in device 140-4 in the vehicle 130, a wearable device 140-5, or the like, or any combination thereof. In some embodiments, the mobile device 140-1 may include a smart home device, a wearable device, a smart mobile device, a virtual reality device, an augmented reality device, or the like, or any combination thereof. The smart home device may include a smart lighting device, a control device of an intelligent electrical apparatus, a smart monitoring device, a smart television, a smart video camera, an interphone, or the like, or any combination thereof. The wearable device may include a smart bracelet, a smart footgear, a smart glass, a smart helmet, a smartwatch, smart clothing, a smart backpack, a smart accessory, or the like, or any combination thereof. The smart mobile device may include a smartphone, a personal digital assistant (PDA), a gaming device, a navigation device, a point of sale (POS) device, or the like, or any combination thereof. The virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc. In some embodiments, the built-in device 140-4 may include an onboard computer, an onboard television, etc.

In some embodiments, the terminal device 140 may include a display that can display information in a human-readable form, such as text, image, audio, video, graph, animation, or the like, or any combination thereof. The display of the terminal device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the terminal device 140 may be connected to one or more components (e.g., the server 110, the vehicle(s) 130, the storage device 150) of the route planning system 100 via the network 120. In some embodiments, the server 110 may be integrated into the terminal device(s) 140.

The storage device 150 may store data and/or instructions. In some embodiments, the storage device 150 may store data obtained from the server 110, the vehicle(s) 130, the terminal device(s) 140, an external storage device, etc. For example, the storage device 150 may store a map of a target region. As another example, the storage device 150 may store a target route of a target vehicle. In some embodiments, the storage device 150 may store data and/or instructions that the server 110 may execute or use to perform exemplary methods described in the present disclosure. For example, the storage device 150 may store instructions that the route planning system 100 may execute or use to obtain motion status information associated with one or more vehicles other than a target vehicle in a target region. As another example, the storage device 150 may store instructions that the route planning system 100 may execute or use to determine a target route of a target vehicle based at least in part on a start location of the target vehicle, a destination of the target vehicle, motion status information associated with one or more vehicles, and a map.

In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the vehicle(s) 130, the terminal device(s) 140) of the route planning system 100. One or more components of the route planning system 100 may access the data or instructions stored in the storage device 150 via the network 120. In some embodiments, the storage device 150 may be directly connected to or communicate with one or more components (the server 110, the vehicle(s) 130, the terminal device(s) 140) of the route planning system 100. In some embodiments, the storage device 150 may be part of the server 110. For example, the storage device 150 may be integrated into the server 110.

It should be noted that the route planning system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure.

Figure 2:
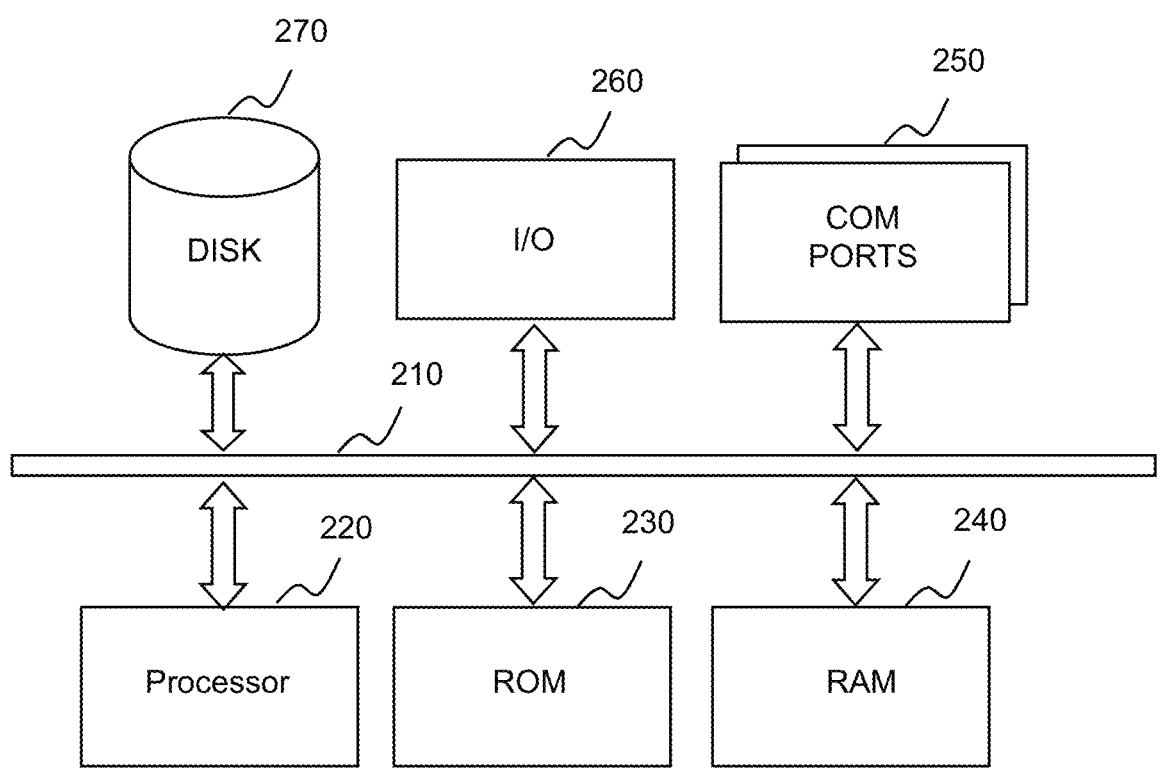
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110 may be implemented on the computing device 200. For example, the processing device 112 may be implemented on the computing device 200 and configured to perform functions of the processing device 112 disclosed in this disclosure.

The computing device 200 may be used to implement any component of the route planning system 100 as described herein. For example, the processing device 112 may be implemented on the computing device 200, via its hardware, software program, firmware, or a combination thereof. Although only one such computer is shown, for convenience, the computer functions relating to route planning and/or scheduling as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include one or more storages configured to store various data files (e.g., program instructions) to be processed and/or transmitted by the computing device 200. In some embodiments, the one or more storages may include a high speed random access memory (not shown), a non-volatile memory (e.g., a magnetic storage device, a flash memory, or other non-volatile solid state memories) (not shown), a disk 270, a read-only memory (ROM) 230, or a random-access memory (RAM) 240, or the like, or any combination thereof. In some embodiments, the one or more storages may further include a remote storage corresponding to the processor 220. The remote storage may connect to the computing device 200 via the network 120. The computing device 200 may also include program instructions stored in the one or more storages (e.g., the ROM 230, RAM 240, and/or another type of non-transitory storage medium) to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both operation A and operation B, it should be understood that operation A and operation B may also be performed by two different processors 220 jointly or separately in the computing device 200 (e.g., a first processor executes operation A and a second processor executes operation B, or the first and second processors jointly execute operations A and B).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 3:
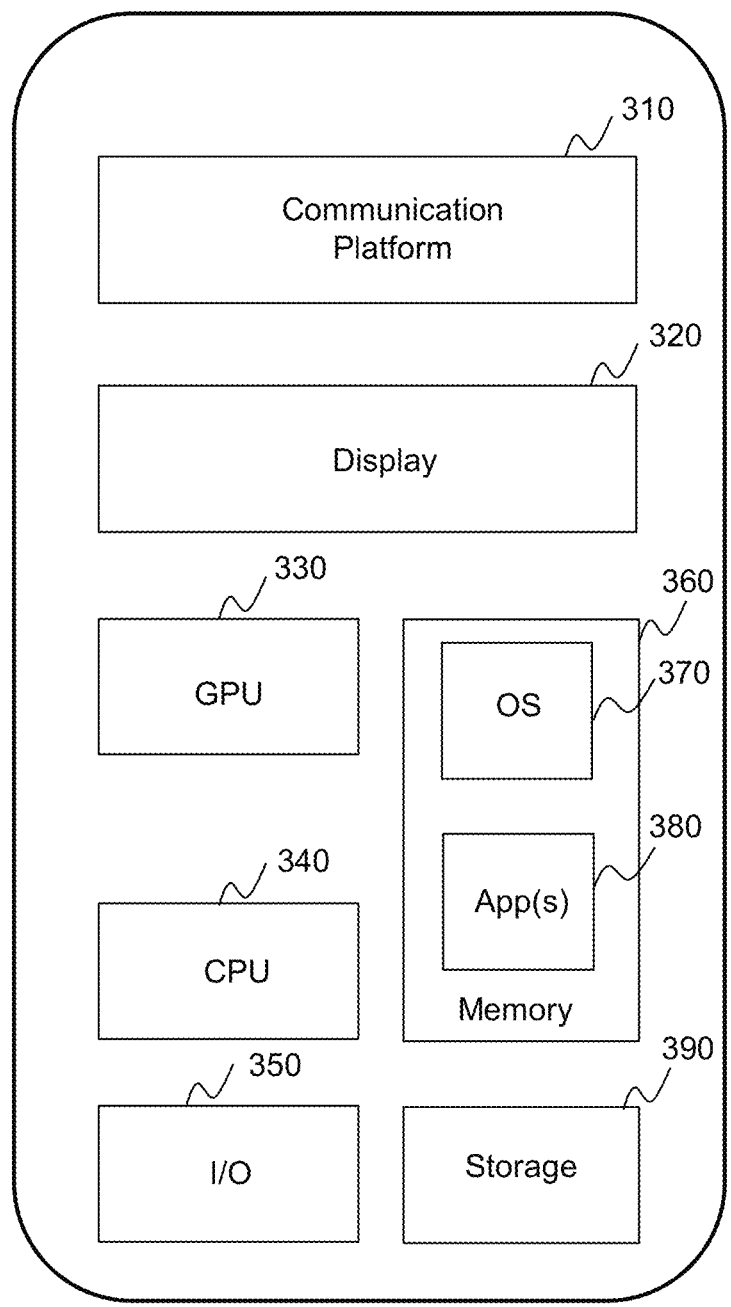
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the server 110 (e.g., the processing device 112) or the terminal device(s) 140 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, a mobile operating system (OS) 370, and a storage 390. In some embodiments, any other suitable components, including but not limited to a system bus or a controller (not shown), may also be in the mobile device 300.

In some embodiments, the mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to action recognition or other information from the route planning system 100. User interactions with the information stream may be achieved via the I/O 350 and provided to the processing device 112 and/or other components of the route planning system 100 via the network 120.

Figure 4:
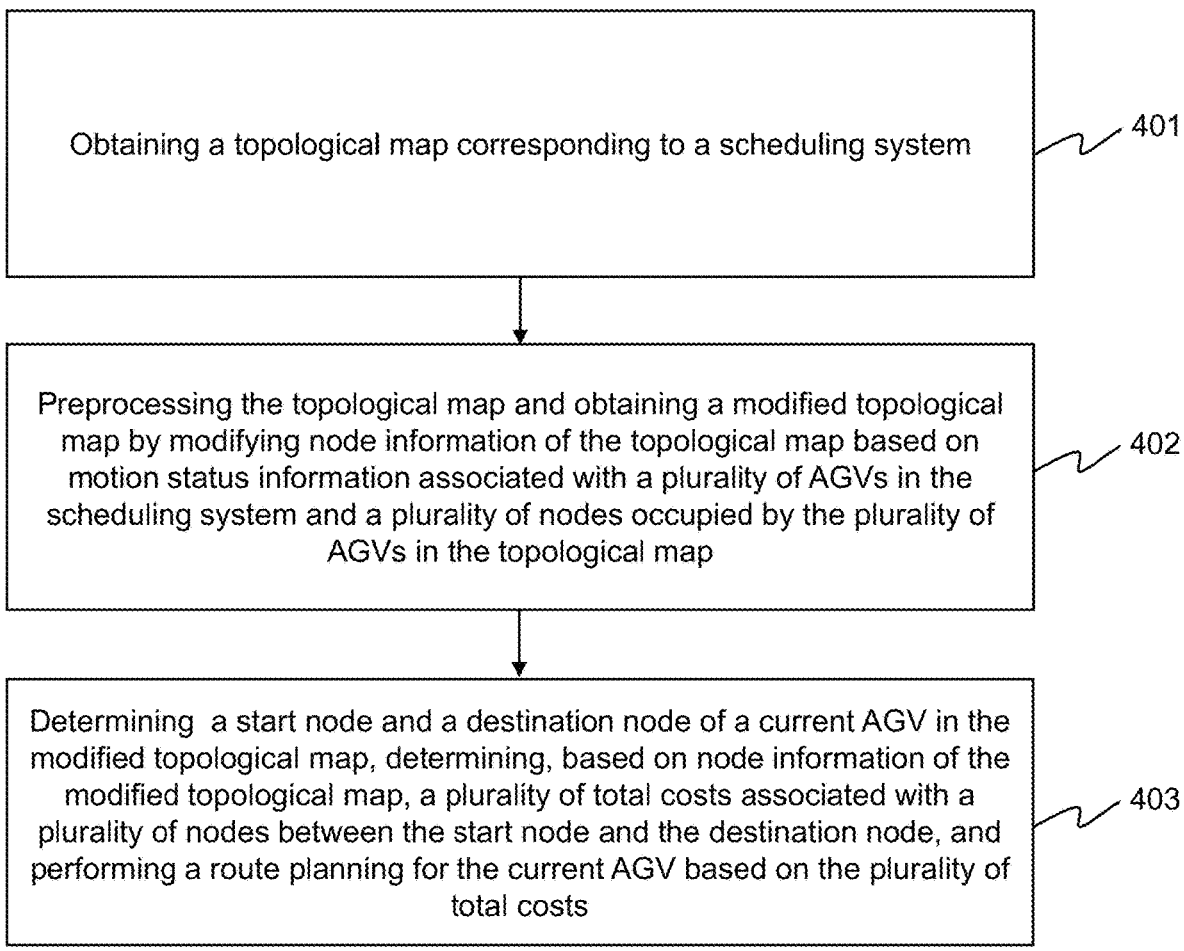
FIG. 4 is a flowchart illustrating an exemplary process for route planning for an automatic guided vehicle (AGV) based on a topological map according to some embodiments of the present disclosure.

FIG. 4 is a flowchart illustrating an exemplary process for route planning for an automatic guided vehicle (AGV) based on a topological map according to some embodiments of the present disclosure. In some embodiments, the process 400 may be implemented as a set of instructions (e.g., an application) stored in the storage ROM 230 or RAM 240. The processor 220 and/or the modules in FIG. 6 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described and/or without one or more of the operations herein discussed, Additionally, the order in which the operations of the process as illustrated in FIG. 4 and described below is not intended to be limiting.

In 401, a topological map corresponding to a scheduling system (e.g., the route planning system 100) may be obtained. The topological map may be obtained by the processing device 112 (e.g., a location obtaining module 610 or a map obtaining module 620 illustrated in FIG. 6), As used herein, the topological map may be a map in which an environment (e.g., an indoor environment) may be expressed by a plurality of nodes and connection relationships among the plurality of nodes. In some embodiments, the topological map may include a location of each of the plurality of nodes and node information thereof.

In 402, the topological map may be preprocessed and a modified topological map may be obtained by modifying node information of the topological map based on motion status information associated with a plurality of AGVs in the scheduling system and a plurality of nodes occupied by the plurality of AGVs in the topological map. The motion status information associated with the plurality of AGVs may be obtained by the processing device 112 (e.g., a motion status obtaining module 630 illustrated in FIG. 6) and the topological map may be preprocessed by the processing device 112 (e,g., a route determination module 640 illustrated in FIG. 6).

In 403, a start node and a destination node of a current AGV in the modified topological map may be determined. A plurality of total costs (also can be referred to as "cost" for brevity) associated with a plurality of nodes between the start node and the destination node may be determined based on node information of the modified topological map. A route planning may be performed for the current AGV based on the plurality of total costs. The operation 403 may be performed by the processing device 112 (e.g., the route determination module 640 illustrated in FIG. 6).

In some embodiments, the topological map may include a global environment topological map or a local environment topological map stored in the scheduling system. For example, the global environment topological map may be a map in which an overall indoor environment may be reflected and which may include node information representing the overall indoor environment; the local environment topological map may be a map including a certain region from the start node to the destination node. In some embodiments, the topological map may also be obtained by the scheduling system from other storage devices storing topological maps.

In some embodiments, for each of the plurality of nodes in the topological map, the location of the node may be represented by a serial number or a barcode (e.g., a one-dimensional barcode, a two-dimensional barcode (e.g., a quick response (QR) code). The node information of the node may include a weight value of the node, a passability of the node (e.g., whether a vehicle is allowed to pass through the node), a turn capability of the node (e.g., whether a vehicle is allowed to turn at the node), a count (e.g., 4, 8) of adjacent nodes, a connectivity of the node to the adjacent nodes, or the like, or any combination thereof. In some embodiments, the higher the weight value of the node is, the greater the total cost of the node may be, and accordingly the higher the probability that a vehicle bypasses the node may be.

In some embodiments, the scheduling system may obtain locations of initial nodes (e.g., start nodes) occupied by the plurality of AGVs and locations of destination nodes of tasks executed by the plurality of AGVs. The scheduling system may also obtain motion status information associated with the plurality of AGVs. In some embodiments, the plurality of AGVs may include one or more static AGVs and one or more moving AGVs. Accordingly, a shortest route from the start node to the destination node which bypasses other AGVs may be planned for the current AGV based on the modified topological map.

In some embodiments, the scheduling system may also obtain states of the plurality of AGVs. For a specific AGV, the state may include an idle state (also referred to as "schedulable state") and a non-idle state (also referred to as "non-schedulable state"). The idle state may refer to that there is no task to be executed (or being executed) by the specific AGV; the non-idle state may refer to that there is a task to be executed (or being executed) by the specific AGV. Additionally or alternatively, the non-idle state may also refer to that the specific AGV may be in charge, in maintenance, etc. In some embodiments, according to the states of the plurality of AGVs, a task may be allocated to an AGV in the idle state. As used herein, the task may include a specified task corresponding to a specified AGV and an unspecified task corresponding to an unspecified AGV (e.g., any AGV in the idle state).

According to different AGVs corresponding to different-tasks, the task may be allocated to the AGV under the two following situations.

Situation 1: if a specified AGV corresponding to a specified task is in the idle state in the modified topological map, the specified task may be allocated to the specified AGV; if the specified AGV is in the non-idle state, the specified task may be allocated to the specified AGV after the specified AGV is in the idle state.

Situation 2: for each unspecified task, an unspecified AGV in the idle state that is nearest to the destination node of the unspecified task may be determined in the modified topological map and the unspecified task may be allocated to the unspecified AGV.

In some embodiments, the (modified) topological map may also be updated based on changes of the node information of the (modified) topological map. In some embodiments, a part of the node information may be updated. Additionally or alternatively, all of the node information may be updated. For example, a weight value of a node, a passability of the node, and/or a turn capability of the node may be updated. The manner for updating the (modified) topological map may be defined by a user. For example, the (modified) topological map may be updated at a certain time interval (e.g., per 1 minute, per 2 minutes, per 5 minutes, per month, per two months).

In some embodiments, the preprocessing of the topological map may include a first preprocessing and a second preprocessing. In some embodiments, the topological map may be preprocessed by performing the first preprocessing or the second preprocessing separately. In some embodiment, the topological map may be preprocessed by collectively performing the first preprocessing and the second preprocessing. For illustration purposes, a situation under which the topological map is preprocessed by performing the first preprocessing firstly and then performing the second preprocessing is described as an example.

The first preprocessing may be performed on the topological map by modifying node information corresponding to the one or more static AGVs, for example, a weight value of a node, a passibility of the node, a turn capability of the node, etc. Further, a first route planning may be performed for the current AGV based on a first modified topological map. When it is detected that a first route of the first route planning at least partially overlaps with at least a part of one or more routes corresponding to the one or more moving AGVs, it may be determined that the current AGV collides with at least one of the one or more moving AGVs. Then the second preprocessing may be performed on the topological map. Further, a second route planning may be performed for the current AGV based on a second modified topological map with a node where the current AGV is located as a second start node.

In some embodiments, the scheduling system may determine a start node of the current AGV based on the nodes in the (modified) topological map. If the current AGV is not located on a node, a node nearest to the current AGV may be designated as the start node of the current AGV for the route planning. If the nearest node is occupied by other AGVs, a next-nearest node to the current AGV may be selected as the start node for the route planning.

In some embodiments, the node information (e.g., a weight value of the node, a passibility of the node, a turn capability of the node, a count of adjacent nodes, a connectivity of the node to the adjacent nodes) of the plurality of nodes in the modified topological map may be determined. Further, a plurality of nodes that the current AGV can move to in the modified topological map may be determined based on the node information and a plurality of total costs associated with the plurality of nodes may be determined. Then the route planning may be performed for the current AGV based on the plurality of total costs.

In some embodiments, the process for determining the total cost associated with a node between the start node and the destination node may be an iterative process including a plurality of cycles. For each cycle, an updated current node may be determined and at least one next node of the updated current node may be determined. One (e.g., a next node with the minimum total cost) of the at least one next node may be determined as a next updated current node based on at least one total cost associated with the at least one next node.

According to the embodiments of the present disclosure, the topological map obtained by the scheduling system is an updated topological map which can reflect the changes of the node information of the topological map in actual situations. Further, the preprocessing on the topological map can ensure that nodes in a planned route are reachable and the planned route is consistent with the actual situations. The first preprocessing performed on the topological map can ensure that the current AGV moving along the first route of the first route planning can avoid other static AGVs; the second preprocessing performed on the topological map can ensure that the current AGV moving along the second route of the second planning can avoid the one or more moving AGVs. Thus, according to the embodiments of the present disclosure, a situation under which the current AGV may collide with other AGVs can be avoided.

In some embodiments, the preprocessing on the topological map may include the first preprocessing and/or the second preprocessing.

According to the first preprocessing performed on the topological map, for each of the one or more static AGVs other than the current AGV in the topological map, node information of one or more nodes within a preset region with the static AGV as a center may be modified. Further, a first modified topological map may be generated based on the modified node information.

According to the second preprocessing performed on the topological map, for each of the one or more static AGVs other than the current AGV in the topological map, node information of one or more nodes within a preset region with the static AGV as a center may be modified; for each of the one or more moving AGVs in the topological map, node information of one or more nodes of a planned route that the moving AGV has not passed may be modified. Further, a second modified topological map may be generated based on the modified node information.

In some embodiments, for each of the one or more static AGVs other than the current AGV in the topological map, the one or more nodes within the preset region with the static AGV as the center may include nodes within a region determined by expanding the static AGV by a specified size. The specified size may be a default setting of the route planning system 100 or may be adjustable under different situations. For example, the specified size may be determined based on a size of the static AGV and/or a distance between adjacent nodes in the topological map.

In some embodiments, the first preprocessing and the second preprocessing may be performed separately.

For example, the first preprocessing may be performed on the topological map by modifying node information corresponding to the one or more static AGVs. Accordingly, nodes along a planned route (e.g., a first route) for the current AGV may be determined based on the node information of the nodes in the first modified topological map.

As another example, the second preprocessing may be performed on the topological map by modifying node information corresponding to the one or more static AGVs and node information corresponding to the one or more moving AGVs. Accordingly, nodes along a planned route (e.g., a second route) for the current AGV may be determined based on the node information of the nodes in the second modified topological map.

In some embodiments, the first preprocessing and the second preprocessing may be performed collectively.

Firstly, the first modified topological map may be obtained by performing the first preprocessing on the topological map.

Secondly, a first route planning may be performed for the current AGV based on the first modified topological map. When it is detected that the current AGV collides with at least one of the one or more moving AGVs if it moves along a first route of the first route planning, it may be determined the first route planning failed. Then the second preprocessing may be performed on the topological map.

In some embodiments, the start node and the destination node of the current AGV in the modified topological map may be determined. According to node information of the modified topological map, a plurality of total costs associated with a plurality of nodes between the start node and the destination node may be determined. Further, route planning may be performed for the current AGV based on the plurality of total costs.

Specifically, a first start node and a first destination node of the current AGV may be determined in the first modified topological map. A plurality of first total costs associated with a plurality of nodes between the first start node and the first destination node may be determined based on node information in the first modified topological map. A first route planning may be performed for the current AGV based on the plurality of first total costs.

In some embodiments, the first start node may be a first available node nearest to a start location (e.g., a location of the current AGV) of the current AGV in the first modified topological map. The first destination node may be a first available node nearest to a destination of the current AGV in the first modified topological map. As used herein, an available node refers to a node not occupied by other AGVs and not a barrier.

In response to detecting that the current AGV collides with at least one of the one or more moving AGVs if it moves along a first route of the first route planning, a second start node and a second destination node of the current AGV in the second modified topological map may be determined. A plurality of second total costs associated with a plurality of nodes between the second start node and the second destination node may also be determined based on node information in the second modified topological map Further, a second route planning may be performed for the current AGV based on the plurality of second total costs.

In some embodiments, the second start node may be a second available node nearest to the start location (e.g., the location of the current AGV) of the current AGV in the second modified topological map. The second destination node may be a second available node nearest to a destination of the current AGV in the second modified topological map. In some embodiments, the second start node may be the same as or different from the first start node; similarly, the second destination node may be the same as or different from the first destination node. For example, if the first available node is not a barrier or occupied by other AGVs in the second modified topological map, the second start node may be the same as the first start node.

In some embodiments, a total cost corresponding to a node may include a first cost from the start node to the node and a second cost from the node to the destination node.

In some embodiments, for each of the one or more static AGVs other than the current AGV in the topological map, the node information of the one or more nodes within the preset region with the static AGV as the center may be modified by modifying one or more weight values of the one or more nodes as one or more high weight values (e.g., weight values greater than a preset threshold) and setting the one or more nodes as nodes incapable of turn. Take a specific node as an example, a high weight value may indicate that an AGV is allowed to bypass the specific node.

In some embodiments, for each of the static AGVs other than the current AGV in the topological map, the node information of the one or more nodes within the preset region with the static AGV as the center may be modified by setting the one or more nodes as impassable nodes and designating the one or more nodes as one or more barriers. For each of the one or more moving AGVs in the topological map, the node information of the one or more nodes of the planned route that the moving AGV has not passed may be modified by setting one or more weight values of the one or more nodes as one or more high weight values (e.g., weight values greater than a preset threshold).

In some embodiments, after the start node and the destination node of the current AGV in the modified topological map are determined, if it is determined that the start node or the destination node is a barrier based on the node information of the modified topological map, it may be determined that the route planning faded. In some embodiments, if it is determined that the start node is a barrier, a node next-nearest to the current AGV (it is assumed that the node is not a barrier and not occupied by other AGVs) may be designated as a new start node and a new route planning may be performed for the current AGV.

In some embodiments, the start node may be designated as a first current node of a route. For each cycle, when an updated current node is determined and the updated current node is not the destination node, a next node of the updated current node may be determined. Specifically, one or more total costs associated with one or more nodes other than nodes of the route may be determined and a node with a minimum total cost may be determined as a node on the route and as the next node of the updated current node. Further, the next node may be determined as an updated current node in a next cycle.

In some embodiments, the total cost corresponding to a node may include a plurality of parameters reflecting a route cost from a parent node (which can be considered as a "current node") of the node (which can be considered as a "next node") to the node, for example, a cost from the parent node to the node, a turn cost from the parent node to the node, a weight value of the node, or the like, or any combination thereof. It should be noted that the exemplary parameters are provided for illustration purposes and other parameters may also be used based on practical demands. For example, the parameters may also include a parameter regarding price information (e.g., toll station, fuel consumption), road information (e.g., road type, road width, traffic light, traffic control, road congestion, speed limit), or the like, or any combination thereof.

In some embodiments, the total cost corresponding to the node may be determined based on a cost from the current node to the node and/or a cost from the node to the destination node.

For example, the total cost corresponding to the node may be determined according to formula (1) below:

$$f(n)=g(n)+h(n) \tag{1}$$

where n refers to a serial number of the node, f (n) refers to the total cost corresponding to the node, g (n) refers to the cost from the current node to the node, and h(n) refers to the cost from the node to the destination node.

In some embodiments, the cost from the node to the destination node may be determined using a Manhattan distance according to formula (2) below:

$$h(n)=|x_{s_0}-x_n|+|y_{s_0}-y_n| \tag{2}$$

where $x_{s_0}$ and $y_{s_0}$ refer to an X-coordinate and a Y-coordinate of the destination node respectively and $x_n$ and $y_n$ refer to an X-coordinate and a Y-coordinate of the node respectively.

In some embodiments, the cost from the current node to the node may be determined based on a total cost corresponding to the current node, a weight value of the node, a distance cost determined based on a distance from the current node to the node, and/or a turn cost from the current node to the node.

For example, the cost from the current node to the node may be determined according to formula (3) below:

$$g(n) = \text{cost}(n) + g(n_{pre}) + dis(n_{pre}, n) + \text{angle}(n_{pre}, n) \quad (3)$$

where cost(n) refers to the weight value of the node, $g(n_{pre})$ refers to the total cost corresponding to the current node, $dis(n_{pre}, n)$ refers to the distance cost determined based on the distance from the current node to the node, and angle $(n_{pre}, n)$ refers to the turn cost from the current node to the node.

In some embodiments, the distance cost from the current node to the node may be determined according to formula (4) below:

$$dis(n_{pre}, n) = |x_{n_{pre}} - x_n| + |y_{n_{pre}} - y_n| \quad (4)$$

where $x_{n_{pre}}$ and $y_{n_{pre}}$ refer to an X-coordinate and a Y-coordinate of the current node respectively and $x_n$ and $y_n$ refer to an X-coordinate and a Y-coordinate of the node respectively.

In some embodiments, the turn cost from the current node of the node may be determined according to formula (5) below:

$$\text{angle}(n_{pre}, n) = \alpha \times |\varphi_{n_{pre}} - \varphi_n| \quad (5)$$

where $\varphi_{n_{pre}}$ refers to a target angle of the current node, $\varphi_n$ refers to a target angle of the node, and $\alpha$ refers to a weighting factor of the turn cost.

In some embodiments, a node with the minimum cost may be determined based on a binary heap structure.

In some embodiments, the start node of the current AGV in the modified topological map may be determined. Specifically, a node nearest to the current AGV may be determined. The node may be designated as the start node when the node is not occupied by AGVs other than the current AGV.

In some embodiments, the node information in the topological map may include a weight value of the node, a passability of the node (e.g., whether a vehicle is allowed to pass through the node), a turn capability of the node (e.g., whether a vehicle is allowed to turn at the node), a count (e.g., 4, 8) of adjacent nodes, a connectivity of the node to the adjacent nodes, or the like, or any combination thereof.

Figure 5:
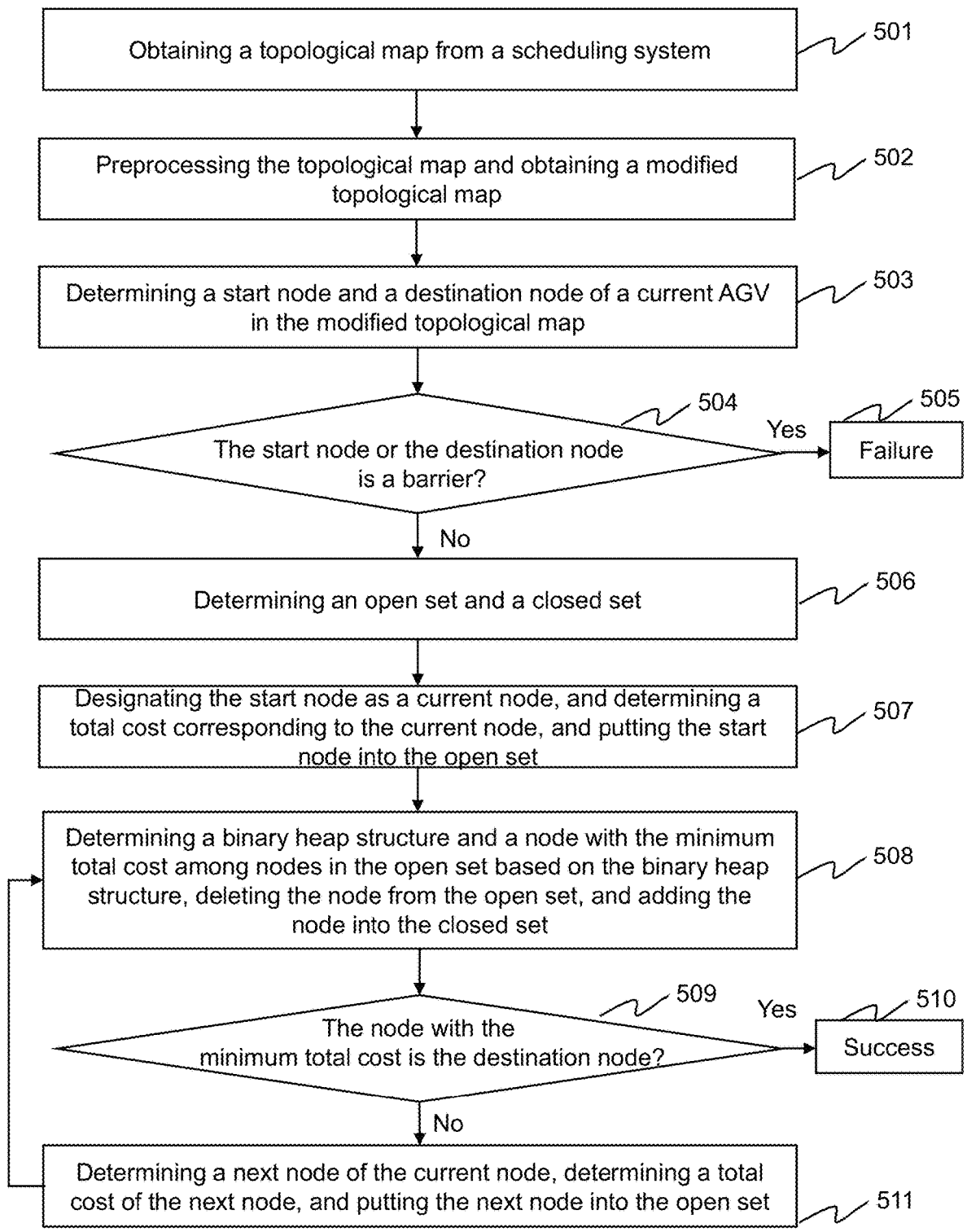
FIG. 5 is a flowchart illustrating an exemplary process for route planning for an AGV according to some embodiments of the present disclosure.

FIG. 5 is a flowchart illustrating an exemplary process for route planning for an AGV according to some embodiments of the present disclosure. In some embodiments, the process 500 may be implemented as a set of instructions (e.g., an application) stored in the storage ROM 230 or RAM 240. The processor 220 and/or the modules in FIG. 6 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

In 501, a topological map may be obtained from a scheduling system. Operation 501 may be similar to operation 401 and detailed description is not repeated here.

In 502, the topological map may be preprocessed and a modified topological map may be obtained based on serial numbers of nodes occupied by a plurality of AGVs, motion status information of the plurality of AGVs, and node information (e.g., turn capabilities) of the nodes in the topological map. Operation 502 may be similar to operation 501 and detailed description is not repeated here.

In 503, a start node and a destination node of a current AGV in the scheduling system may be determined in the (modified) topological map based on a serial number of a node occupied by the current AGV and a destination of a task allocated to the current AGV.

In 504, whether the start node or the destination node is a barrier may be determined. In response to determining that the start node or the destination node is a barrier, the process 500 may proceed to operation 505. In response to determining that the start node and the destination node are not barriers, the process 500 may proceed to operation 506.

In 505, it may be determined that the route planning failed.

In 506, an open set $S = \{s_n\}$ may be determined and used for storing nodes to be searched for the route planning in the (modified) topological map; a closed set $U = \{u_m\}$ may be determined and used for storing nodes which are already searched for the route planning.

In 507, the start node may be designated as a current node, a total cost corresponding to the current node may be determined, and the start node may be put into the open set.

In 508, a binary heap structure may be determined, a node with the minimum total cost may be determined among nodes in the open set based on the binary heap structure, and the node may be deleted from the open set and added into the closed set.

In 509, whether the node with the minimum total cost is the destination node may be determined. In response to determining that the node with the minimum total cost is the destination node, the process 500 may proceed to operation 510. In response to determining that the node with the minimum total cost is not the destination node, the process 500 may proceed to operation 511.

In 510, it may be determined that the route planning succeeds. Previous nodes of the destination node may be determined until a previous node is the start node.

In 511, a next node of the current node may be determined, a total cost of the next node may be determined, and the next node may be put into the open set. Then the process may proceed to operation 508.

The next node of the current node may be determined by determining total costs associated with adjacent nodes in four directions (e.g., the upper direction, the lower direction, the left direction, and the right direction) of the current node based on node information (e.g., passability) of the nodes in the (modified) topological map.

Figure 6:
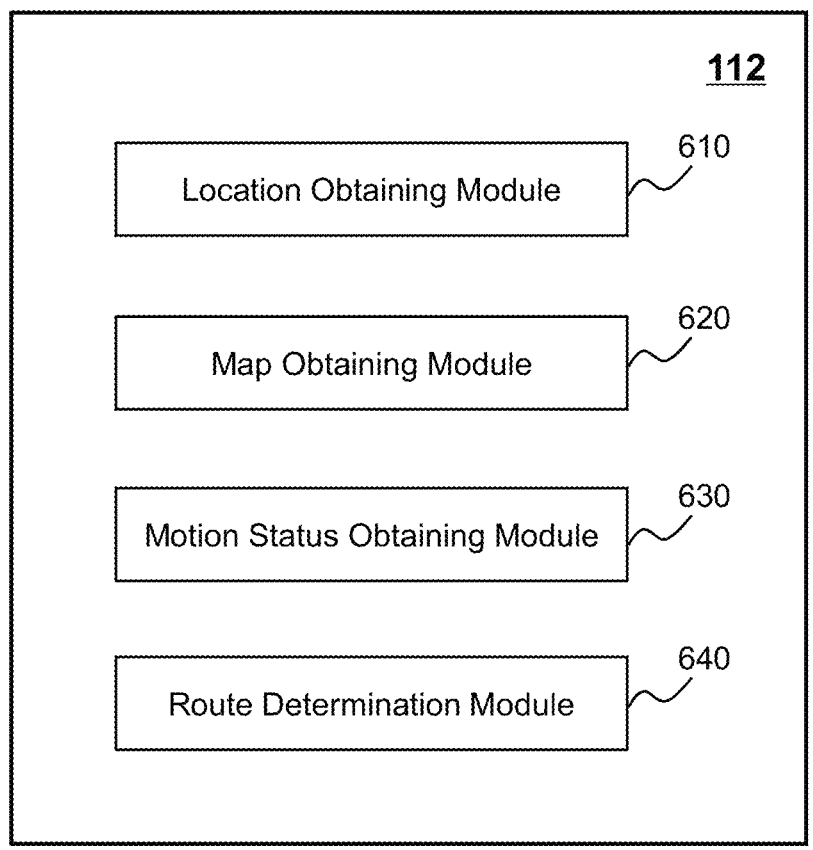
FIG. 6 is a block diagram illustrating an exemplary processing device according to some embodiments of the present disclosure.

FIG. 6 is a block diagram illustrating an exemplary processing device according to some embodiments of the present disclosure. The processing device 112 may include a location obtaining module 610, a map obtaining module 620, a motion status obtaining module 630, and a route determination module 640.

The location obtaining module 610 may be configured to obtain a start location and a destination of a target vehicle (e.g., the vehicle 130). In some embodiments, the start location and/or the destination may be associated with a task allocated to the target vehicle. In some embodiments, the start location may be a current location of the target vehicle and the destination may be a location where the object is located. In some embodiments, the start location may be the location where the object is located and the destination may be a delivery location of the object. In some embodiments, the start location may be the current location of the target vehicle and the destination may be the delivery location of the object.

The map obtaining module 620 may be configured to obtain a map of a target region including the start location and the destination. In some embodiments, the map may include a topological map, a grid map, a geometric map, a point cloud map, etc. In some embodiments, the map may include a plurality of nodes and node information (the passability) of each of the plurality of nodes in the map. In some embodiments, the map obtaining module 620 may obtain the map from a storage device (e.g., the storage device 150) of the route planning system 100, an external device, etc. In some embodiments, the map obtaining module 620 may obtain the map by extracting a part of a preliminary map (which may correspond to a region larger than the target region) corresponding to the target region. Additionally or alternatively, the map obtaining module 620 may obtain the whole preliminary map.

The motion status obtaining module 630 may be configured to obtain motion status information associated with one or more vehicles other than the target vehicle in the target region. In some embodiments, the motion status associated with each of the one or more vehicles may include a static status and a moving status. In some embodiments, the motion status obtaining module 630 may obtain the motion status information based on location information of the one or more vehicles. Take a specific vehicle as an example, if the location of the specific vehicle remains the same within a time period (e.g., 5 seconds, 20 seconds, 30 seconds, 1 minute, 2 minutes, 5 minutes), the motion status obtaining module 630 may determine that the specific vehicle is in the static status; whereas if the location of the specific vehicle changes with time, the motion status obtaining module 630 may determine that the specific vehicle is in the moving status. In some embodiments, the one or more vehicles may transmit the motion status information to the motion status obtaining module 630 via the network 120.

The route determination module 640 may be configured to determine a target route of the target vehicle based at least in part on the start location, the destination, the motion status information associated with the one or more vehicles, and the map. In some embodiments, the route determination module 640 may determine the target route using a route planning algorithm. The route planning algorithm may include an A-star algorithm, a modified A-star algorithm, a Dijkstra algorithm, a Floyd-Warshall algorithm, a Bellman-Ford algorithm, a rapidly-exploring random tree (RRT) algorithm, or the like, or any combination thereof.

In some embodiments, for at least one of the plurality of nodes, the route determination module 640 may determine target node information by modifying at least part of the node information of each of the at least one of the plurality of nodes based on the motion status information associated with the one or more vehicles. Then the route determination module 640 may generate a target map based on the map and the target node information of the at least one of the plurality of nodes. Further, the route determination module 640 may determine the target route of the target vehicle based on the target map, the start location, and the destination.

In some embodiments, the route determination module 640 may determine a start node from the plurality of nodes based on the start location in the target map and a destination node from the plurality of nodes based on the destination in the target map. As used herein, the start node may be an available node (e.g., a node not occupied by the one or more vehicles other than the target vehicle and not a barrier) nearest to the start location (e.g., the location of the target vehicle) and the destination node may be an available node nearest to the destination. Further, the route determination module 640 may determine the target route of the target vehicle based on a plurality of costs associated with a plurality of target nodes between the start node and the destination node. As used herein, the cost of a node may indicate a cost of a route from the start node to the destination node if the route includes the node.

The modules in the processing device 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the location obtaining module 610 and the map obtaining module 620 may be combined as a single module which may both obtain a start location and a destination of a target vehicle and a map of a target region including the start location and the destination. As another example, the processing device 112 may include a task allocation module (not shown) which may allocate a task (e.g., delivering goods) to the target vehicle. As a further example, the processing device 112 may include a storage module (not shown) which may be used to store data generated by the above-mentioned modules.

Figure 7:
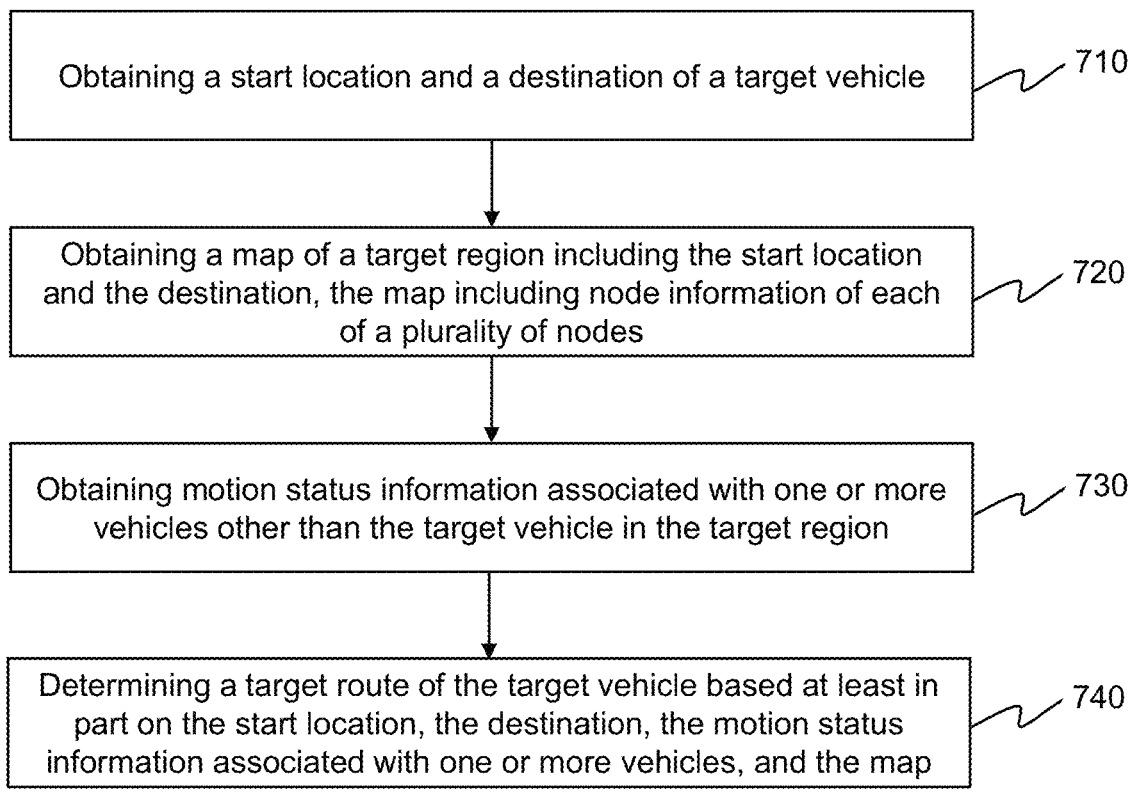
FIG. 7 is a flowchart illustrating an exemplary process for determining a target route of a target vehicle according to some embodiments of the present disclosure.

FIG. 7 is a flowchart illustrating an exemplary process for determining a target route of a target vehicle according to some embodiments of the present disclosure. In some embodiments, the process 700 may be implemented as a set of instructions (e.g., an application) stored in the storage ROM 230 or RAM 240. The processor 220 and/or the modules in FIG. 6 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations herein discussed. Additionally, the order in which the operations of the process as illustrated in FIG. 7 and described below is not intended to be limiting.

In 710, the processing device 112 (e.g., the location obtaining module 610) (e.g., the interface circuits or the processing circuits of the processor 220) may obtain a start location and a destination of a target vehicle (e.g., the vehicle 130).

In some embodiments, the start location and/or the destination may be associated with a task allocated to the target vehicle by the processing device 112, for example, a task for delivering an object (e.g., goods, food, a passenger) to a delivery location. In some embodiments, the start location may be a current location of the target vehicle and the destination may be a location where the object is located. In some embodiments, the start location may be the location where the object is located and the destination may be a delivery location of the object. In some embodiments, the start location may be the current location of the target vehicle and the destination may be the delivery location of the object. More descriptions regarding allocating the tasks may be found elsewhere in the present disclosure (e.g., FIG. 9 and the description thereof).

In 720, the processing device 112 (e.g., the map obtaining module 620) (e.g., the interface circuits or the processing circuits of the processor 220) may obtain a map of a target region including the start location and the destination. In some embodiments, the target region may include a plurality of environmental objects, for example, goods, a road, a tree, a vehicle, a building, a river, a pedestrian, or the like, or any combination thereof. Accordingly, the map may include map data indicative of the environmental objects of the target region.

In some embodiments, the map data may include location information of the plurality of environmental objects, semantic information of the plurality of environmental objects, or the like, or any combination thereof. Exemplary location information of an environment object may include latitude information, longitude information, height information (or elevation information), etc. Exemplary semantic information of an environment object may include a serial number of the environment object, a name of the environment object, a type (e.g., a type (e.g., expressway) of a road) of the environment object, attribute information (e.g., a speed limit of a road, "one-way" or not, a turning restriction) of the environment object, or the like, or any combination thereof.

In some embodiments, the map may include a topological map, a grid map, a geometric map, a point cloud map, etc. In some embodiments, the map may include a plurality of nodes each of which may represent a specified point (e.g., a corner, a gateway, an intersection, a stop station) or a specified unit (e.g., a circle, a rectangle, a triangle) of the target region.

In some embodiments, the map data may also include node information of each of the plurality of nodes in the map. For example, the node information of the node may include a serial number of the node, a barcode (e.g., a one-dimensional barcode, a two-dimensional barcode (e.g., a quick response (QR) code) of the node, a location (which may be expressed by latitude, longitude, and height (or elevation)) of the node, a coordinate of the node, a weight value of the node, a passability of the node (e.g., whether a vehicle is allowed to pass through the node), a turn capability of the node (e.g., whether a vehicle is allowed to turn at the node), a count (e.g., 4, 8) of adjacent nodes, a connectivity of the node to the adjacent nodes, or the like, or any combination thereof.

In some embodiments, the serial number or the barcode of the node may be unique and used to represent the location of the node. In some embodiments, the higher the weight value of the node is, the greater the cost of the node may be, and accordingly the higher the probability that a vehicle bypasses the node may be.

In some embodiments, the node information may be default settings of the route planning system 100 or may be adjustable under different situations. For example, for all or part of the plurality of nodes, the weight value may be set as a default value (e.g., 0), the passability of the node may be set to allow vehicles to pass through, the turn capability of the node may be set to allow vehicles to turn at the node, etc. As another example, for at least part of the plurality of nodes, the node information may be associated with environmental conditions, for example, passability restriction (e.g., road control, one-way restriction), turn restriction, etc. More descriptions regarding the node information may be found elsewhere in the present disclosure (e.g., FIG. 10 and the description thereof).

In some embodiments, the processing device 112 may obtain the map from a storage device (e.g., the storage device 150) of the route planning system 100, an external device, etc. In some embodiments, the processing device 112 may obtain the map by extracting a part of a preliminary map (which may correspond to a region larger than the target region) corresponding to the target region. Additionally or alternatively, the processing device 112 may obtain the whole preliminary map.

In 730, the processing device 112 (e.g., the motion status module 630) (e.g., the interface circuits or the processing circuits of the processor 220) may obtain motion status information associated with one or more vehicles other than the target vehicle in the target region.

In some embodiments, the motion status associated with each of the one or more vehicles may include a static status and a moving status. In some embodiments, the processing device 112 may obtain the motion status information based on location information of the one or more vehicles. Take a specific vehicle as an example, if the location of the specific vehicle remains the same within a time period (e.g., 5 seconds, 20 seconds, 30 seconds, 1 minute, 2 minutes, 5 minutes), the processing device 112 may determine that the specific vehicle is in the static status; whereas if the location of the specific vehicle changes with time, the processing device 112 may determine that the specific vehicle is in the moving status. In some embodiments, the one or more vehicles may transmit the motion status information to the processing device 112 via the network 120.

In 740, the processing device 112 (e.g., the route determination module 640) (e.g., the processing circuits of the processor 220) may determine a target route of the target vehicle based at least in part on the start location, the destination, the motion status information associated with the one or more vehicles, and the map.

In some embodiments, the processing device 112 may determine the target route using a route planning algorithm. The route planning algorithm may include an A-star algorithm, a modified A-star algorithm, a Dijkstra algorithm, a Floyd-Warshall algorithm, a Gellman-Ford algorithm, a rapidly-exploring random tree (RRT) algorithm, or the like, or any combination thereof.

In some embodiments, for at least one of the plurality of nodes, the processing device 112 may determine target node information by modifying at least part of the node information of each of the at least one of the plurality of nodes based on the motion status information associated with the one or more vehicles. More descriptions regarding modifying the node information may be found elsewhere in the present disclosure (e.g., FIG. 8 and the description thereof). Then the processing device 112 may generate a target map based on the map and the target node information of the at least one of the plurality of nodes. Further, the processing device 112 may determine the target route of the target vehicle based on the target map, the start location, and the destination.

In some embodiments, the processing device 112 may determine a start node from the plurality of nodes based on the start location in the target map and a destination node from the plurality of nodes based on the destination in the target map. As used herein, the start node may be an available node (e.g., a node not occupied by the one or more vehicles other than the target vehicle and not a barrier) nearest to the start location (e.g., the location of the target vehicle) and the destination node may be an available node nearest to the destination. Further, the processing device 112 may determine the target route of the target vehicle based on a plurality of costs associated with a plurality of target nodes between the start node and the destination node. As used herein, the cost of a node may indicate a cost of a route from the start node to the destination node if the route includes the node.

Figure 10:
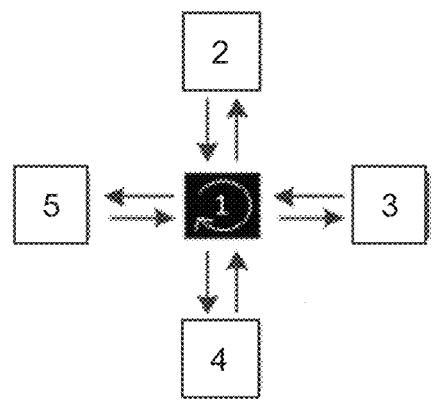
FIG. 10 is a schematic diagram illustrating exemplary node information of a node according to some embodiments of the present disclosure.

Merely by way of example, as described in connection with FIG. 4, the processing device 112 may determine a first set (e.g., the open set) and a second set (e.g., the closed set) and perform a cyclic process based on the first set and the second set. In an initialization state, the first set only includes the start node and the second set is an empty set. In a first cycle, the processing device 112 may move the start node to the second set and add at least one relevant node of the start node into the first set. As used herein, for a specific node, the relevant node may refer to an adjacent node which is reachable (e.g., passable, capable of turn) from the specific node. For example, as illustrated in FIG. 10, for node 1, the at least one relevant node includes node 2, node 3, node 4, and node 5. Further, the processing device 112 may determine at least one cost of the at least one relevant node and move a relevant node with the minimum cost into the second set. Then the processing device 112 may determine whether the relevant node with the minimum cost is the destination node. In response to a determination that the relevant node is the destination node, the processing device 112 may determine a parent node (which is the start node for the first cycle) of the relevant node and sequentially determine a parent node of the parent node until reaches the start node. Further, the processing device 112 may determine a route from the start node to the destination including the intermediate nodes (i.e., the relevant nodes with the minimum cost in multiple cycles) as the target route. In response to a determination that the relevant node is not the destination node, the processing device 112 may designate the relevant node as a current node and execute a next cycle.

In an ith cycle, for a relevant node with the minimum cost determined in a previous cycle (also can be considered as an ith "current node"), the processing device 112 may determine at least one relevant node of the current node and add the at least one relevant node into the first set. Then the processing device 112 may determine at least one cost of the at least one relevant node. Further, for each of the at least one relevant node, the processing device 112 may determine whether the relevant node is already in the first set. In response to a determination that the relevant node is already in the first set, the processing device 112 may determine whether a cost of the relevant node determined in the current cycle (also referred to as a "current cost") is less than a cost of the relevant node determined in a previous cycle (also referred to as a "previous cost"). In response to a determination that the current cost of the relevant node is less than the previous cost of the relevant node, the processing device 112 may update the cost of the relevant node and update a parent node (which may be a previously current node in a previous cycle) of the relevant node as the current node. In response to a determination that the current cost of the relevant node is larger than or equal to the previous cost of the relevant node, the processing device 112 may maintain the cost and the parent node of the relevant node for further processing. In response to a determination that the relevant node is not in the first set, the processing device 112 may determine a parent node of the relevant node as the current node. Further, the processing device 112 may determine a relevant node with the minimum cost and determine whether the relevant node with the minimum cost is the destination node. Similar to the above, in response to a determination that the relevant node is the destination node, the processing device 112 may determine a parent node of the relevant node and sequentially determine a parent node of the parent node until reaches the start node. Further, the processing device 112 may determine a route from the start node to the destination including the intermediate nodes (i.a, the relevant nodes with the minimum cost in multiple cycles) as the target route. In response to a determination that the relevant node is not the destination node, the processing device 112 may designate the relevant node as a next current node and execute a next cycle until an updated relevant node is the destination node.

In some embodiments, the processing device 112 may determine the cost of a node based on a first cost from the start node to the node and a second cost from the node to the destination node. For example, the processing device 112 may determine the cost of the node according to formula (6) below:

$$f(n)=g(n)+h(n) \quad (6)$$

where n refers to a serial number of the node, f (n) refers to the cost of the node, g (n) refers to the first cost from the start node to the node, and h(n) refers to the second cost from the node to the destination node.

In some embodiments, the processing device 112 may determine the first cost according to formula (7) below:

$$g(n)=\text{cost}(n)+g(n_{pre})+dis(n_{pre},n)+\text{angle}(n_{pre},n) \quad (7)$$

where cost(n) refers to a weight value of the node, $g(n_{pre})$ refers to a cost of a parent node of the node, $dis(n_{pre}, n)$ refers to a cost from the parent node of the node to the node, and $\text{angle}(n_{pre}, n)$ refers to a turn cost from the parent node of the node to the node.

In some embodiments, the processing device 112 may determine the cost from the parent node of the node to the node according to formula (8) below:

$$dis(n_{pre},n)=|x_{n_{pre}}-x_n|+|y_{n_{pre}}-y_n| \quad (8)$$

where $x_{n_{pre}}$ and $y_{n_{pre}}$ refer to an X-coordinate and a Y-coordinate of the parent node of the node respectively and $x_n$ and $y_n$ refer to an X-coordinate and a Y-coordinate of the node respectively.

In some embodiments, the processing device 112 may determine the turn cost from the parent node of the node to the node according to formula (9) below:

$$\text{angle}(n_{pre},n)=\alpha\times|\varphi_{n_{pre}}-\varphi_n| \quad (9)$$

where $\varphi_{n_{pre}}$ refers to a target angle of the parent node of the node, $\varphi_n$ refers to a target angle of the node, and $\alpha$ refers to a weighting factor of the turn cost.

In some embodiments, the processing device 112 may determine the second cost from the node to the destination node according to formula (10) below:

$$h(n)=|x_{s_0}-x_n|+|y_{s_0}-y_n| \quad (10)$$

where $x_{s_0}$ and $y_{s_0}$ refer to an X-coordinate and a Y-coordinate of the destination node respectively. It can be seen that the second cost from the node to the destination node can be determined based on a Manhattan distance. It should be noted that the Manhattan distance is provided for illustration purposes and the second cost also can be determined based on other distances, for example, a Euclidean distance, etc.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing device 112 may perform operation 720 before operation 710 or simultaneously perform operations 710 and 720, As another example, the processing device 112 may automatically update the target node information based on newly obtained motion status information according to a predetermined time interval (e.g., 1 minute, 2 minutes, 5 minutes) or update the target node information upon receiving a request for updating the target node information.

Figure 8:
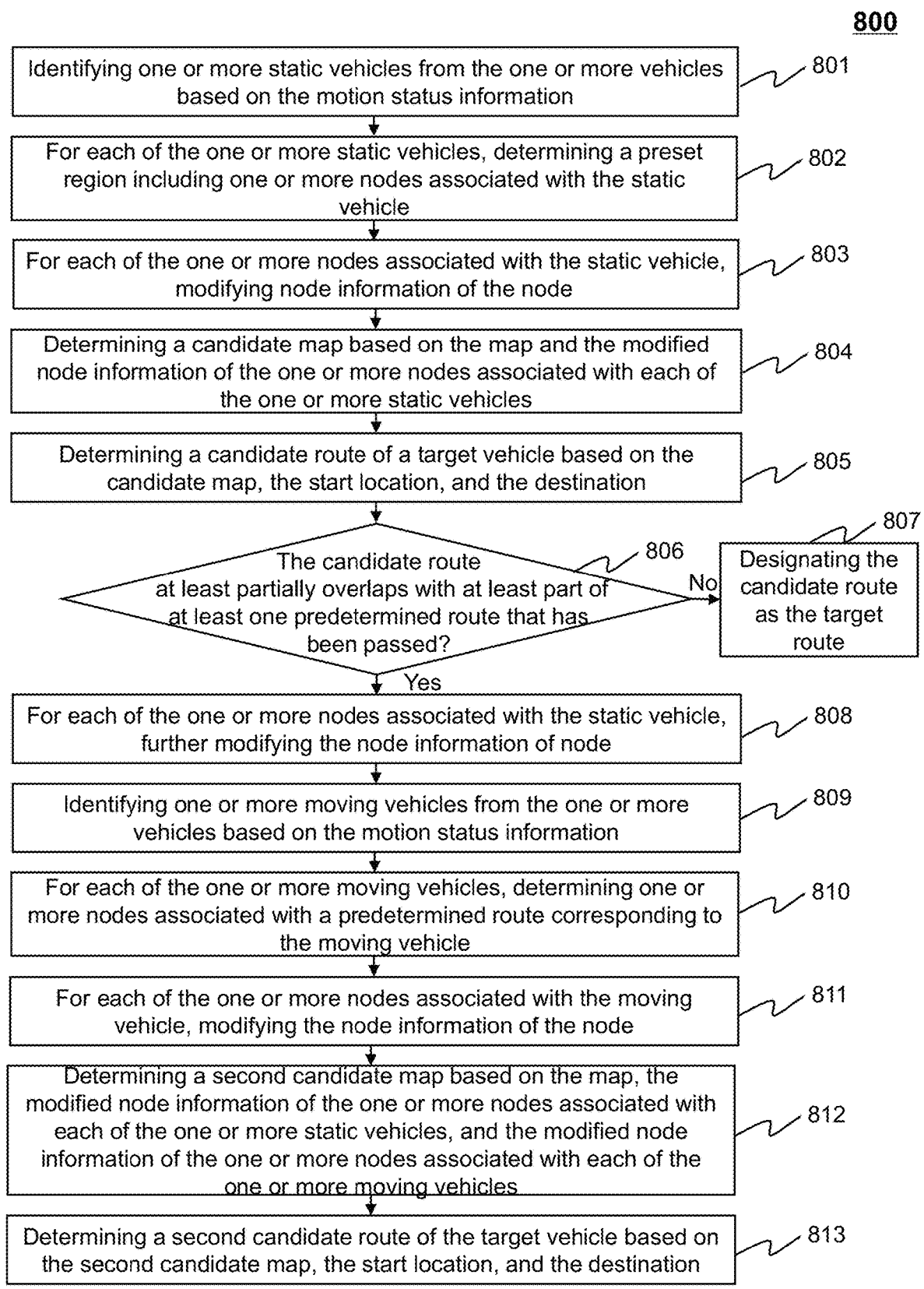
FIG. 8 is a flowchart illustrating an exemplary process for determining a target route of a target vehicle according to some embodiments of the present disclosure.

FIG. 8 is a flowchart illustrating an exemplary process for determining a target route of a target vehicle according to some embodiments of the present disclosure. In some embodiments, the process 800 may be implemented as a set of instructions (e.g., an application) stored in the storage ROM 230 or RAM 240. The processor 220 and/or the modules in FIG. 6 may execute the set of instructions, and when executing the instructions, the processor 220 and/or the modules may be configured to perform process 800. The operations of the illustrated process presented below are intended to be illustrative. In some embodiments, process 800 may be accomplished with one or more additional operations not described and/or without one or more of the operations herein discussed. Additionally, the order in which the operations of the process as illustrated in FIG. 8 and described below is not intended to be limiting.

In 801, the processing device 112 (e.g., the route determination module 640) (e.g., the processing circuits of the processor 220) may identify one or more static vehicles from the one or more vehicles based on the motion status information. As described in connection with operation 730, the motion status associated with each of the one or more vehicles may include the static status and the moving status. Accordingly, the one or more static vehicles are vehicle(s) in the static status.

In 802, for each of the one or more static vehicles, the processing device 112 (e.g., the route determination module 640) (e.g., the processing circuits of the processor 220) may determine a preset region (e,g., a region with the static vehicle as a center) including one or more nodes associated with the static vehicle. In some embodiments, the processing device 112 may designate a region occupied by the static vehicle as the preset region. In some embodiments, the processing device 112 may determine the preset region by expanding (e.g., proportionally expanding) the region occupied by the static vehicle. In some embodiments, the size and/or the shape of the preset region may be default settings of the route planning system 100 or may be adjustable under different situations. For example, the larger the size of the static vehicle is, the larger the preset region may be. As another example, the shorter a distance between two adjacent nodes in the map is, the larger the preset region may be. As a further example, the shape of the preset region may include a circle, a rectangle, a triangle, or any regular or irregular shape.

In 803, for each of the one or more nodes associated with the static vehicle, the processing device 112 (e.g., the route determination module 640) (e.g., the processing circuits of the processor 220) may modify node information of the node. In some embodiments, the processing device 112 may assign a weight value larger than a predetermined threshold to the node. In some embodiments, the higher the weight value of the node is, the greater the total cost of the node may be, and accordingly the higher the probability that a vehicle bypasses the node may be. In some embodiments, the processing device 112 may also designate the node as a node incapable of turn (i.e., a vehicle is not allowed to turn left or turn right at the node).

In 804, the processing device 112 (e.g., the route determination module 640) (e.g., the processing circuits of the processor 220) may determine a candidate map based on the map and the modified node information of the one or more nodes associated with each of the one or more static vehicles. For example, the processing device 112 may generate the candidate map by updating the node information of the one or more nodes associated with each of the one or more static vehicles as the modified node information.

In 805, the processing device 112 (e.g., the route determination module 640) (e.g., the processing circuits of the processor 220) may determine a candidate route of the target vehicle based on the candidate map, the start location, and the destination. As described in connection with operation 740, the processing device 112 may determine a candidate start node from the plurality of nodes based on the start location in the candidate map, a candidate destination node from the plurality of nodes based on the destination in the candidate map, and determine the candidate route based on the candidate start node and the candidate destination node.

In some embodiments, the processing device 112 may determine whether a node nearest to the start location or a node nearest to the destination is a barrier or occupied by a vehicle other than the target vehicle. In response to a determination that both the node nearest to the start location and the node nearest to the destination are not barriers and not occupied by other vehicles, the processing device 112 may designate the node nearest to the start location and the node nearest to the destination as the candidate start node and the candidate destination node, respectively. In response to a determination that the node nearest to the start location is a barrier or occupied by a vehicle other than the target vehicle, the processing device 112 may determine a next-nearest node to the start location and determine whether the next-nearest node is a barrier or occupied by a vehicle other than the target vehicle until an available node is identified, or the processing device 112 may wait until the nearest node is released. In response to a determination that the node nearest to the destination is a barrier or occupied by a vehicle other than the target vehicle, the processing device 112 may determine that the route planning failed, or the processing device 112 may wait until the nearest node is released. Additionally or alternatively, the processing device 112 may determine an available node within a predetermined distance (e.g., 20 m, 50 m, 70 m, 100 m) from the destination as the candidate destination node.

In some embodiments, as described in connection with operation 740, the processing device 112 may determine the candidate route based on a plurality of costs associated with a plurality of target nodes between the candidate start node and the candidate destination node.

In 806, the processing device 112 (e.g., the route determination module 640) (e.g., the processing circuits of the processor 220) may determine whether the candidate route at least partially overlaps with at least part of at least one predetermined route that has not been passed. As used herein, the at least one predetermined route may correspond to at least one moving vehicle of the one or more vehicles.

In response to a determination that the candidate route does not overlap with the part of the at least one predetermined route that has not been passed, in 807, the processing device 112 (e.g., the route determination module 640) (e.g., the processing circuits of the processor 220) may designate the candidate route as the target route of the target vehicle.

In response to a determination that the candidate route at least partially overlaps with the at least part of the at least one predetermined route that has not been passed, in 808, for each of the one or more nodes associated with the static vehicle, the processing device 112 (e.g., the route determination module 640) (e.g., the processing circuits of the processor 220) may further modify the node information of node. In some embodiments, the processing device 112 may designate the node as a barrier.

In 809, the processing device 112 (e.g., the route determination module 640) (e.g., the processing circuits of the processor 220) may identify one or more moving vehicles from the one or more vehicles based on the motion status information. The one or more moving vehicles are vehicle(s) in the moving status.

In 810, for each of the one or more moving vehicles, the processing device 112 (e.g., the route determination module 640) (e.g., the processing circuits of the processor 220) may determine one or more nodes associated a predetermined route corresponding to the moving vehicle. For example, the processing device 112 may determine all nodes on a part of the predetermined route that the moving vehicle has not passed. As another example, the processing device 112 may determine a part (e.g., top N) of the nodes on the part of the predetermined route that the moving vehicle has not passed. Additionally or alternatively, for each of the one or more moving vehicles, the processing device 112 may determine a preset region (e.g., a region with the moving vehicle as a center, which may be determined in a manner similar to the manner for determining the preset region associated with the static vehicle) associated with the moving vehicle and determine one or more nodes within the preset region.

In 811, for each of the one or more nodes associated with the moving vehicle, the processing device 112 (e.g., the route determination module 640) (e.g., the processing circuits of the processor 220) may modify the node information of the node. In some embodiments, the processing device 112 may assign a weight value larger than a predetermined threshold (which may be different from or the same as the predetermined threshold corresponding to the weight value associated with the static vehicle described above) to the node.

In 812, the processing device 112 (e.g., the route determination module 640) (e.g., the processing circuits of the processor 220) determine a second candidate map based on the map, the modified node information of the one or more nodes associated with each of the one or more static vehicles, and the modified node information of the one or more nodes associated with each of the one or more moving vehicles. For example, the processing device 112 may generate the second candidate map by updating the node information of the one or more nodes associated with each of the one or more static vehicles and the one or more moving vehicles as the modified node information.

In 813, the processing device 112 (e.g., the route determination module 640) (e.g., the processing circuits of the processor 220) may determine a second candidate route of the target vehicle based on the second candidate map, the start location, and the destination. As described in connection with operation 740 and operation 805, the processing device 112 may determine a second candidate start node from the plurality of nodes based on the start location in the second candidate map, a second candidate destination node from the plurality of nodes based on the destination in the second candidate map, and determine the second candidate route based on the second candidate start node and the second candidate destination node. In some embodiments, the second candidate start node may be the same as or different from the candidate start node above; similarly, the second candidate destination node may be the same as or different from the candidate destination node above. For example, if the candidate start node is not a barrier or occupied by other vehicles in the second candidate map, the second candidate start node may be the same as the candidate start node.

In some embodiments, the processing device 112 may directly designate the second candidate route as the target route. In some embodiments, the processing device 112 may further determine whether the second candidate route at least partially overlaps with at least part of at least one predetermined route that has not been passed. In response to a determination that the second candidate route does not overlap with the part of the at least one predetermined route that has not been passed, the processing device 112 may designate the second candidate route as the target route. In response to a determination that the second candidate route at least partially overlaps with the at least part of at least one predetermined route that has not been passed, the processing device 112 may further update the second candidate map by modifying at least part of the node information in the second candidate map and further perform a route planning based on the updated map.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 801-807 may be omitted and the processing device 112 may directly generate the second candidate map (which can be considered as the "target map") by modifying node information of the node(s) associated with the one or more static vehicles and node information of the node(s) associated with the one or more moving vehicles and determine the target route based on the second candidate map.

Figure 9:
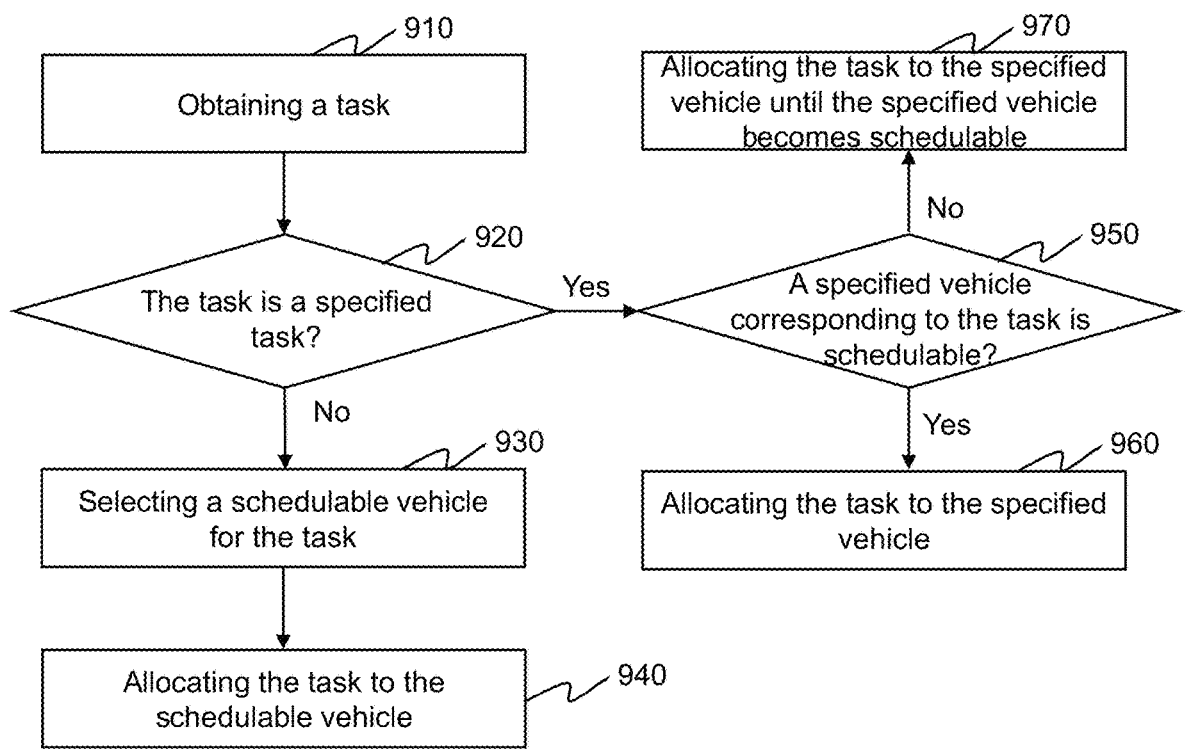
FIG. 9 is a flowchart illustrating an exemplary process for allocating a task according to some embodiments of the present disclosure.

FIG. 9 is a flowchart illustrating an exemplary process for allocating a task according to some embodiments of the present disclosure. In some embodiments, process 900 may be implemented as a set of instructions (e.g., an application) stored in the storage ROM 230 or RAM 240. The processor 220 and/or the modules in FIG. 6 may execute the set of instructions, and when executing the instructions, the processor 220 and/or the modules may be configured to perform process 900. The operations of the illustrated process presented below are intended to be illustrative. In some embodiments, process 900 may be accomplished with one or more additional operations not described and/or without one or more of the operations herein discussed. Additionally, the order in which the operations of the process as illustrated in FIG. 9 and described below is not intended to be limiting.

In 910, the processing device 112 (e.g., the task avocation module) (e.g., the interface circuits or the processing circuits of the processor 220) may obtain a task. In some embodiments, the task may be a task for delivering an object (e.g., goods, food, a passenger) to a delivery location.

In 920, the processing device 112 (e.g., the task avocation module) (e.g., the processing circuits of the processor 220) may determine whether the task is a specified task.

In response to a determination that the task is an unspecified task, in 930, the processing device 112 (e.g., the task allocation module) (e.g., the processing circuits of the processor 220) may select a schedulable vehicle (i.e., there is no task to be executed or being executed by the vehicle) for the task. For example, the processing device 112 may select a schedulable vehicle nearest to the delivery location.

In 940, the processing device 112 (e.g., the task allocation module) (e.g., the processing circuits of the processor 220) may allocate the task to the schedulable vehicle.

In response to a determination that the task is a specified task, in 950, the processing device 112 (e.g., the task allocation module) (e.g., the processing circuits of the processor 220) may determine whether a specified vehicle corresponding to the specified task is schedulable.

In response to a determination that the specified vehicle corresponding to the specified task is schedulable, in 960, the processing device 112 (e.g., the task allocation module) (e.g., the processing circuits of the processor 220) may allocate the specified task to the corresponding specified vehicle.

In response to a determination that the specified vehicle corresponding to the specified task is in the non-schedulable state, in 970, the processing device 112 (e.g., the task allocation module) (e.g., the processing circuits of the processor 220) may allocate the specified task to the corresponding specified vehicle until the vehicle becomes schedulable.

In some embodiments, before allocating the specified task to the corresponding specified vehicle, the processing device 112 may determine whether a location reported by the specified vehicle is accurate. In response to a determination that the location reported by the corresponding specified vehicle is accurate, the processing device 112 may allocate the specified task to the corresponding specified vehicle. In response to a determination that the location reported by the corresponding specified vehicle is inaccurate, the processing device 112 may determine that the task allocation failed. Additionally or alternatively, the processing device 112 may obtain an accurate location of the specified vehicle by using a positioning device and allocate the specified task to the specified vehicle.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIG. 10 is a schematic diagram illustrating node information of a node according to some embodiments of the present disclosure. As illustrated in FIG. 10, take node 1 as an example, node 1 is passable along a direction from node 4 to node 2, a direction from node 2 to node 5, a direction from node 5 to node 3, and a direction from node 3 to node 5. It also can be seen that adjacent nodes of node 1 include node 2, node 3, node 4, and node 5. As indicated by straight arrows, node 1 is interconnected with the four adjacent nodes, that is, the four adjacent nodes are reachable from node 1. Further, node 1 is also capable of turn as indicated by a circular arrow.

Figure 11:
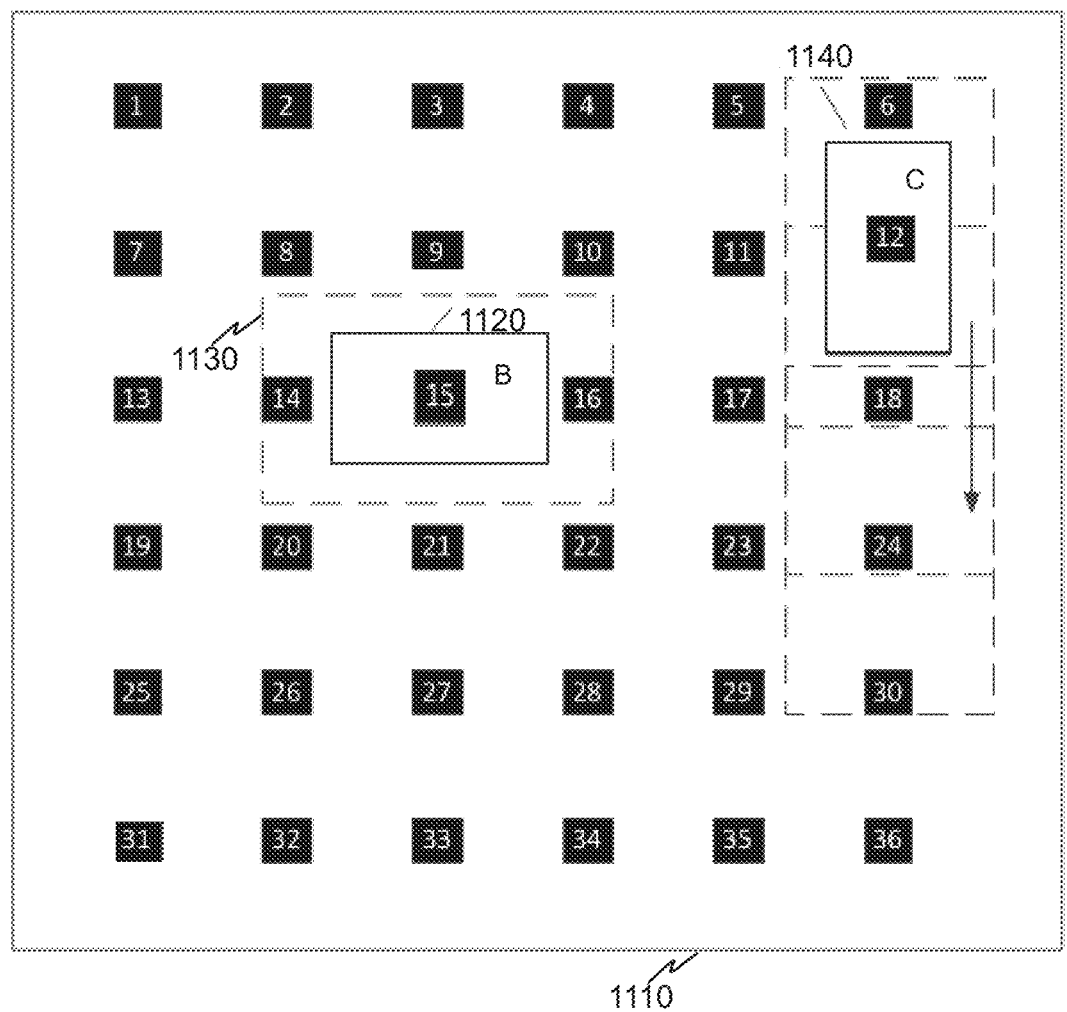
FIG. 11 is a schematic diagram illustrating exemplary nodes associated with a static vehicle and exemplary nodes associated with a moving static vehicle according to some embodiments of the present disclosure.

FIG. 11 is a schematic diagram illustrating exemplary nodes associated with a static vehicle and exemplary nodes associated with a moving static vehicle according to some embodiments of the present disclosure.

As illustrated in FIG. 11, a region 1110 refers to the target region including the start location and the destination, 1120 refers to a static vehicle (indicated by a vehicle B) in the target region, and 1140 refers to a moving vehicle (indicated by a vehicle C) in the target region. As described in connection with FIG. 8, for the static vehicle 1120, the processing device 112 may determine a preset region 1130 with the static vehicle 1120 as a center. It can be seen that the preset region 1130 includes node 14, node 15, and node 16. Further, for each of the three nodes, the processing device 112 may modify node information of the node as described elsewhere in the present disclosure. For the moving vehicle 1140, the processing device 112 may obtain a part of a predetermined route (indicated by an arrow) corresponding to the moving vehicle that will be passed in a predetermined future period. It can be seen that the part of the predetermined route covers node 12, node 18, node 24, and node 30 in a dotted box. Further, for each of the four nodes, the processing device 112 may modify node information of the node as described elsewhere in the present disclosure.

In some embodiments, the present disclosure may also provide a storage medium storing a computer program thereon. When executed by a processor, the computer program may direct the processor to perform a process (e.g., the process 400, the process 500, the process 700, the process 800, the process 900) described elsewhere in the present disclosure.

In some embodiments, the present disclosure may also provide an electronic device including a processor and a storage, wherein the storage stores a computer program. When executed by a processor, the computer program may direct the processor to perform a process (e.g., the process 400, the process 500, the process 700, the process 800, the process 900) described elsewhere in the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic. Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in smaller than all features of a single foregoing disclosed embodiment.

We claim:

1. A system for route planning, comprising:
at least one storage device including a set of instructions; and
at least one processor in communication with the at least one storage device, wherein when executing the set of instructions, the at least one processor is configured to cause the system to:
obtain a start location and a destination of a target vehicle;
obtain a map of a target region including the start location and the destination, the map including node information of each of a plurality of nodes;
obtain motion status information associated with one or more vehicles other than the target vehicle in the target region; and
determine a target route of the target vehicle based at least in part on the start location, the destination, the motion status information associated with the one or more vehicles, and the map;
wherein to determine the target route of the target vehicle based at least in part on the start location, the destination, the motion status information associated with the one or more vehicles, and the map, the at least one processor is configured to cause the system to:
identify one or more static vehicles from the one or more vehicles based on the motion status information;
for each of the one or more static vehicles, determine a preset region including one or more nodes associated with the static vehicle;
for each of the one or more nodes associated with the static vehicle, modify the node information of the node by designating the node as a barrier;
identify one or more moving vehicles from the one or more vehicles based on the motion status information;
for each of the one or more moving vehicles, determine one or more nodes associated with a predetermined route corresponding to the moving vehicle;
for each of the one or more nodes associated with the moving vehicle, modify the node information of the node by assigning a weight value larger than a predetermined threshold to the node;
determine the target map based on the map, the modified node information of the one or more nodes associated with each of the one or more static vehicles, and the modified node information of the one or more nodes associated with each of the one or more moving vehicles;
determine a start node from the plurality of nodes based on the start location in the target map;
determine a destination node from the plurality of nodes based on the destination in the target map; and
determine the target route of the target vehicle based on a plurality of costs associated with a plurality of target nodes between the start node and the destination node, wherein each cost associated with each target node of the plurality of target nodes is a sum of a first cost from the start node to the target node and a second cost from the target node to the destination node, the first cost is determined according to formula (1) below:

$$g(n)=\text{cost}(n)+g(n_{pre})+dis(n_{pre},n)+\text{angle}(n_{pre},n) \quad (1)$$

where cost(n) refers to a weight value of the target node, $g(n_{pre})$ refers to a cost of a parent node of the target node, $dis(n_{pre}, n)$ refers to a cost from the parent node of the target node to the target node, and angle($n_{pre}$, n) refers to a turn cost from the parent node of the target node to the target node, and the second cost is determined according to formula (2) below:

$$h(n)=|x_{s_0}-x_n|+|y_{s_0}-y_n| \qquad (2)$$

where $x_{s_0}$ and $y_{s_0}$ refer to an X-coordinate and a Y-coordinate of the destination node respectively and $x_n$ and $y_n$ refer to an X-coordinate and a Y-coordinate of the target node respectively.

2. The system of claim 1, wherein the node information of each of the plurality of nodes includes at least one of a location of the node, a barcode of the node, a coordinate of the node, a passability of the node, a turn capability of the node, a count of adjacent nodes, or a connectivity of the node to the adjacent nodes.

3. The system of claim 1, wherein, for each of the one or more nodes associated with the static vehicle, to modify the node information of the node, the at least one processor is directed to:
assign a weight value larger than a predetermined threshold to the node, and
designate the node as a node incapable of a turn left or a turn right at the node.

4. The system of claim 1, wherein the at least one processor is configured to cause the system further to:
determine a candidate map based on the map and the modified node information of the one or more nodes associated with each of the one or more static vehicles; and
determine a candidate route of the target vehicle based on the candidate map, the start location, and the destination;
determine whether the candidate route at least partially overlaps with at least part of at least one predetermined route that has not been passed, the at least one predetermined route corresponding to at least one moving vehicle of the one or more vehicles; and
in response to a determination that the candidate route does not overlap with the at least one predetermined route that has not been passed, designate the candidate route as the target route of the target vehicle.

5. The system of claim 4, wherein the at least one processor is configured to cause the system further to:
in response to a determination that the candidate route at least partially overlaps with the at least part of the at least one predetermined route that has not been passed, for each of the one or more nodes associated with the static vehicle, modify the node information of the node;
identify one or more moving vehicles from the one or more vehicles based on the motion status information;
for each of the one or more moving vehicles, determine one or more nodes associated with a predetermined route corresponding to the moving vehicle;
for each of the one or more nodes associated with the moving vehicle, modify the node information of the node;
determine a second candidate map based on the map, the modified node information of the one or more nodes associated with each of the one or more static vehicles, and the modified node information of the one or more nodes associated with each of the one or more moving vehicles; and determine a second candidate route of the target vehicle based on the second candidate map, the start location, and the destination.

6. A method implemented on a computing device including at least one processor, at least one storage medium, and a communication platform connected to a network, the method comprising:
obtaining a start location and a destination of a target vehicle;
obtaining a map of a target region including the start location and the destination, the map including node information of each of a plurality of nodes;
obtaining motion status information associated with one or more vehicles other than the target vehicle in the target region; and
determining a target route of the target vehicle based at least in part on the start location, the destination, the motion status information associated with the one or more vehicles, and the map;
wherein the determining the target route of the target vehicle based at least in part on the start location, the destination, the motion status information associated with the one or more vehicles, and the map includes:
identifying one or more static vehicles from the one or more vehicles based on the motion status information;
for each of the one or more static vehicles, determining a preset region including one or more nodes associated with the static vehicle;
for each of the one or more nodes associated with the static vehicle, modifying the node information of the node by designating the node as a barrier;
identifying one or more moving vehicles from the one or more vehicles based on the motion status information;
for each of the one or more moving vehicles, determining one or more nodes associated with a predetermined route corresponding to the moving vehicle;
for each of the one or more nodes associated with the moving vehicle, modifying the node information of the node by assigning a weight value larger than a predetermined threshold to the node;
determining the target map based on the map, the modified node information of the one or more nodes associated with each of the one or more static vehicles, and the modified node information of the one or more nodes associated with each of the one or more moving vehicles;
determining a start node from the plurality of nodes based on the start location in the target map;
determining a destination node from the plurality of nodes based on the destination in the target map; and
determining the target route of the target vehicle based on a plurality of costs associated with a plurality of target nodes between the start node and the destination node, wherein each cost associated with each target node of the plurality of target nodes is a sum of a first cost from the start node to the target node and a second cost from the target node to the destination node, the first cost is determined according to formula (1) below:

$$g(n)=\text{cost}(n)+g(n_{pre})+dis(n_{pre},n)+\text{angle}(n_{pre},n) \qquad (1)$$

where cost(n) refers to a weight value of the target node, $g(n_{pre})$ refers to a cost of a parent node of the target node, $dis(n_{pre}, n)$ refers to a cost from the parent node of the target node to the target node, and angle($n_{pre}$, n) refers to a turn cost from the parent node of the target node to the target node, and the second cost is determined according to formula (2) below:

$$h(n)=|x_{s_0}-x_n|+|y_{s_0}-y_n| \qquad (2)$$

where $x_{s_0}$ and $y_{s_0}$ refer to an X-coordinate and a Y-coordinate of the destination node respectively and $x_n$ and $y_n$ refer to an X-coordinate and a Y-coordinate of the target node respectively.

7. The method of claim 6, wherein for each of the one or more nodes associated with the static vehicle, the modifying the node information of the node includes:

assigning a weight value larger than a predetermined threshold to the node, and designating the node as a node incapable of a turn left or a turn right at the node.

8. The method of claim 6, further comprising:

determining a candidate map based on the map and the modified node information of the one or more nodes associated with each of the one or more static vehicles; and determining a candidate route of the target vehicle based on the candidate map, the start location, and the destination;

determining whether the candidate route at least partially overlaps with at least part of at least one predetermined route that has not been passed, the at least one predetermined route corresponding to at least one moving vehicle of the one or more vehicles; and in response to a determination that the candidate route does not overlap with the at least one predetermined route that has not been passed, designating the candidate route as the target route of the target vehicle.

9. The method of claim 8, further comprising:

in response to a determination that the candidate route at least partially overlaps with the at least part of the at least one predetermined route that has not been passed, for each of the one or more nodes associated with the static vehicle, modifying the node information of the node;

identifying one or more moving vehicles from the one or more vehicles based on the motion status information;

for each of the one or more moving vehicles, determining one or more nodes associated with a predetermined route corresponding to the moving vehicle;

for each of the one or more nodes associated with the moving vehicle, modifying the node information of the node;

determining a second candidate map based on the map, the modified node information of the one or more nodes associated with each of the one or more static vehicles, and the modified node information of the one or more nodes associated with each of the one or more moving vehicles; and determining a second candidate route of the target vehicle based on the second candidate map, the start location, and the destination.

10. The method of claim 6, wherein the node information of each of the plurality of nodes includes at least one of a location of the node, a barcode of the node, a coordinate of the node, a passability of the node, a turn capability of the node, a count of adjacent nodes, or a connectivity of the node to the adjacent nodes.

11. A non-transitory computer readable medium, comprising executable instructions that, when executed by at least one processor, direct the at least one processor to perform a method, the method comprising:

obtaining a start location and a destination of a target vehicle;

obtaining a map of a target region including the start location and the destination, the map including node information of each of a plurality of nodes;

obtaining motion status information associated with one or more vehicles other than the target vehicle in the target region; and determining a target route of the target vehicle based at least in part on the start location, the destination, the motion status information associated with the one or more vehicles, and the map, wherein the determining the target route of the target vehicle based at least in part on the start location, the destination, the motion status information associated with the one or more vehicles, and the map includes:

identifying one or more static vehicles from the one or more vehicles based on the motion status information;

for each of the one or more static vehicles, determining a preset region including one or more nodes associated with the static vehicle;

for each of the one or more nodes associated with the static vehicle, modifying the node information of the node by designating the node as a barrier;

identifying one or more moving vehicles from the one or more vehicles based on the motion status information;

for each of the one or more moving vehicles, determining one or more nodes associated with a predetermined route corresponding to the moving vehicle;

for each of the one or more nodes associated with the moving vehicle, modifying the node information of the node by assigning a weight value larger than a predetermined threshold to the node;

determining the target map based on the map, the modified node information of the one or more nodes associated with each of the one or more static vehicles, and the modified node information of the one or more nodes associated with each of the one or more moving vehicles;

determining a start node from the plurality of nodes based on the start location in the target map;

determining a destination node from the plurality of nodes based on the destination in the target map; and determining the target route of the target vehicle based on a plurality of costs associated with a plurality of target nodes between the start node and the destination node, wherein each cost associated with each target node of the plurality of target nodes is a sum of a first cost from the start node to the target node and a second cost from the target node to the destination node, the first cost is determined according to formula (1) below:

$$g(n)=\text{cost}(n)+g(n_{pre})+dis(n_{pre},n)+\text{angle}(n_{pre},n) \qquad (1)$$

where cost(n) refers to a weight value of the target node, $g(n_{pre})$ refers to a cost of a parent node of the target node, $dis(n_{pre}, n)$ refers to a cost from the parent node of the target node to the target node, and angle($n_{pre}$, n) refers to a turn cost from the parent node of the target node to the target node, and the second cost is determined according to formula (2) below:

$$h(n)=|x_{s_0}-x_n|+|y_{s_0}-y_n| \qquad (2)$$

where $x_{s_0}$ and $y_{s_0}$ refer to an X-coordinate and a Y-coordinate of the destination node respectively and $x_n$ and $y_n$ refer to an X-coordinate and a Y-coordinate of the target node respectively.

12. The non-transitory computer readable medium of claim 11, wherein, for each of the one or more nodes associated with the static vehicle, the modifying the node information of the node includes:
   assigning a weight value larger than a predetermined threshold to the node, and
   designating the node as a node incapable of a turn left or a turn right at the node.

13. The non-transitory computer readable medium of claim 11, the method further comprising:
   determining a candidate map based on the map and the modified node information of the one or more nodes associated with each of the one or more static vehicles; and
   determining a candidate route of the target vehicle based on the candidate map, the start location, and the destination;
   determining whether the candidate route at least partially overlaps with at least part of at least one predetermined route that has not been passed, the at least one predetermined route corresponding to at least one moving vehicle of the one or more vehicles; and
   in response to a determination that the candidate route does not overlap with the at least one predetermined route that has not been passed, designating the candidate route as the target route of the target vehicle.

14. The non-transitory computer readable medium of claim 13, the method further comprising:
   in response to a determination that the candidate route at least partially overlaps with the at least part of the at least one predetermined route that has not been passed, for each of the one or more nodes associated with the static vehicle, modifying the node information of the node;
   identifying one or more moving vehicles from the one or more vehicles based on the motion status information;
   for each of the one or more moving vehicles, determining one or more nodes associated with a predetermined route corresponding to the moving vehicle;
   for each of the one or more nodes associated with the moving vehicle, modifying the node information of the node;
   determining a second candidate map based on the map, the modified node information of the one or more nodes associated with each of the one or more static vehicles, and the modified node information of the one or more nodes associated with each of the one or more moving vehicles; and
   determining a second candidate route of the target vehicle based on the second candidate map, the start location, and the destination.

* * * * *